(12) United States Patent
Hermanson

(10) Patent No.: US 7,216,898 B1
(45) Date of Patent: May 15, 2007

(54) FLANGED CONNECTOR FOR HVAC DUCTING

(76) Inventor: Jeffrey A. Hermanson, 2827 Deer Island Dr. East, Sumner, WA (US) 98390

( * ) Notice: Subject to any disclaimer, the term of this patent is extended or adjusted under 35 U.S.C. 154(b) by 0 days.

(21) Appl. No.: 10/858,681

(22) Filed: Jun. 1, 2004

Related U.S. Application Data

(63) Continuation of application No. 10/067,726, filed on Feb. 4, 2002, now abandoned, and a continuation-in-part of application No. 09/956,745, filed on Sep. 17, 2001, now abandoned, which is a continuation of application No. 09/484,741, filed on Jan. 18, 2000, now Pat. No. 6,289,706, which is a continuation-in-part of application No. 09/441,037, filed on Nov. 16, 1999, now Pat. No. 6,301,781, which is a continuation-in-part of application No. 08/616,655, filed on Mar. 15, 1996, now Pat. No. 5,983,496.

(60) Provisional application No. 60/266,087, filed on Feb. 2, 2001.

(51) Int. Cl.
   *F16L 25/00* (2006.01)
(52) U.S. Cl. .................... 285/405; 285/424; 285/363
(58) Field of Classification Search ............... 285/424, 285/364, 405, 414, 363; 72/83, 84
   See application file for complete search history.

(56) References Cited

U.S. PATENT DOCUMENTS 2,338,191 A  *  1/1944  Lumm ..................... 285/405

2,826,804 A     3/1958  Wickwire et al.
3,749,425 A     7/1973  Howland
4,023,250 A     5/1977  Sproul et al.

(Continued)

FOREIGN PATENT DOCUMENTS

GB           871 733         6/1961

(Continued)

OTHER PUBLICATIONS

*HVAC Duct Construction Standards, Metal and Flexible*, 1st ed., Sheet Metal and Air Conditioning Contractors National Association, Inc., 1985, Table 1-12.

(Continued)

*Primary Examiner*—Aaron Dunwoody
(74) *Attorney, Agent, or Firm*—Christensen O'Connor Johnson Kindness PLLC

(57) ABSTRACT

Flanged rings for the connection end-to-end of thin, double walled circular ducting includes a first generally-circularly shaped ring having an outer insertion flange for connection to the outer wall of the double-walled duct. The first ring also includes: an exterior mating flange extending transversely from the outer insertion flange to define a first mating face; and an exterior hem that is substantially concentric to the outer flange to extend outwardly from the outer perimeter of the exterior mating flange. The flanged ring also includes: a second ring having an inner insertion flange connectable to the inner wall of the double-walled duct; the interior mating flange transverse from the interior insertion flange to define a second mating face; and an interior connection hem substantially concentric to the inner insertion flange and extending from the outer perimeter of the interior mating flange to overlap and be connected to the outer insertion flange.

19 Claims, 27 Drawing Sheets

U.S. PATENT DOCUMENTS

| | | | |
|---|---|---|---|
| 4,041,746 A | | 8/1977 | Kraft |
| 4,117,704 A | | 10/1978 | Nakache et al. |
| 4,144,732 A | | 3/1979 | Franks et al. |
| 4,170,888 A | | 10/1979 | Golata |
| 4,304,423 A | * | 12/1981 | Mez .......................... 285/405 |
| 4,361,021 A | | 11/1982 | McVay et al. |
| 4,516,797 A | | 5/1985 | Meinig |
| 4,524,595 A | | 6/1985 | Oda |
| 4,765,167 A | | 8/1988 | Sampson |
| 4,940,264 A | * | 7/1990 | Mez .......................... 285/405 |
| 5,129,690 A | | 7/1992 | Meinig et al. |
| 5,352,000 A | * | 10/1994 | Issagholian-Havai et al. .......................... 285/405 |
| 5,393,106 A | | 2/1995 | Schroeder |
| 5,456,099 A | | 10/1995 | Lipari |
| 5,762,109 A | * | 6/1998 | Matthews et al. .......... 138/149 |

FOREIGN PATENT DOCUMENTS

GB      1 581 386      12/1980

OTHER PUBLICATIONS

Johnson, H.V., *Metal Spinning Designs*, The Bruce Publishing Company, 1941, Chap. II, "Tools and Materials," pp. 12-13, 15-16, 21-27.

Reagan, J.E., and E.E. Smith, *Metal Spinning for Craftsmen, Instructors, and Students*, The Bruce Publishing Company, 1936, Chap. IV, "Spinning Tools," pp. 23-32, 34-36.

Stieri, E., *Sheet Metal Principles and Procedures*, C.H. Ewing, Ed., Ch. 9, "Metal Spinning," pp. 176-1985.

Walker, J.R., *Modern Metalworking*, The Goodheart-Willcox Company, Inc. Publishers, 1985, Unit 11, "Sheet Metal," pp. 141-158; Unit 27, "Metal Spinning," pp. 425-436.

\* cited by examiner

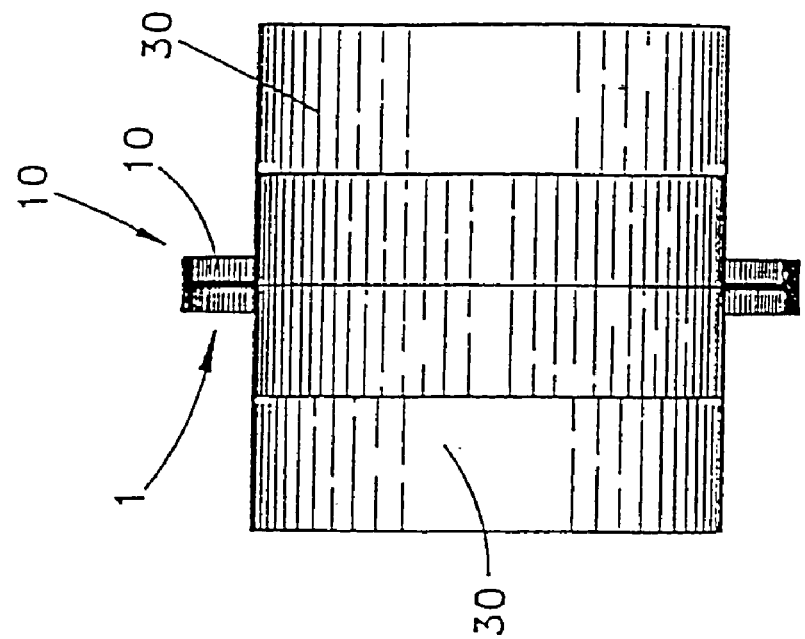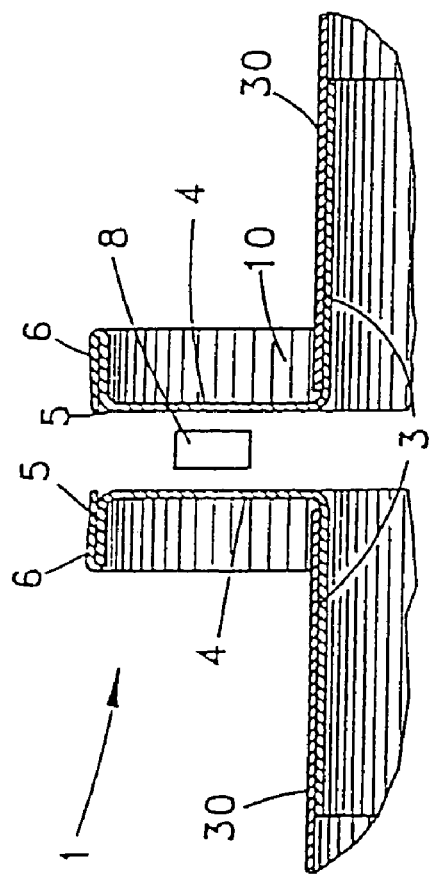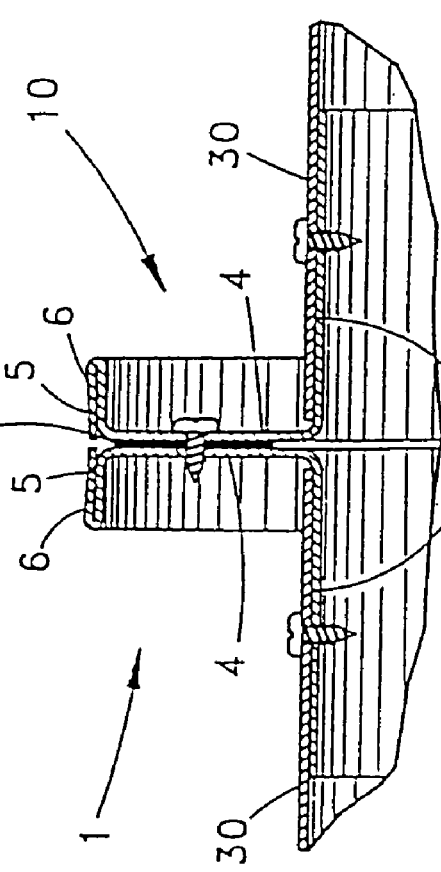

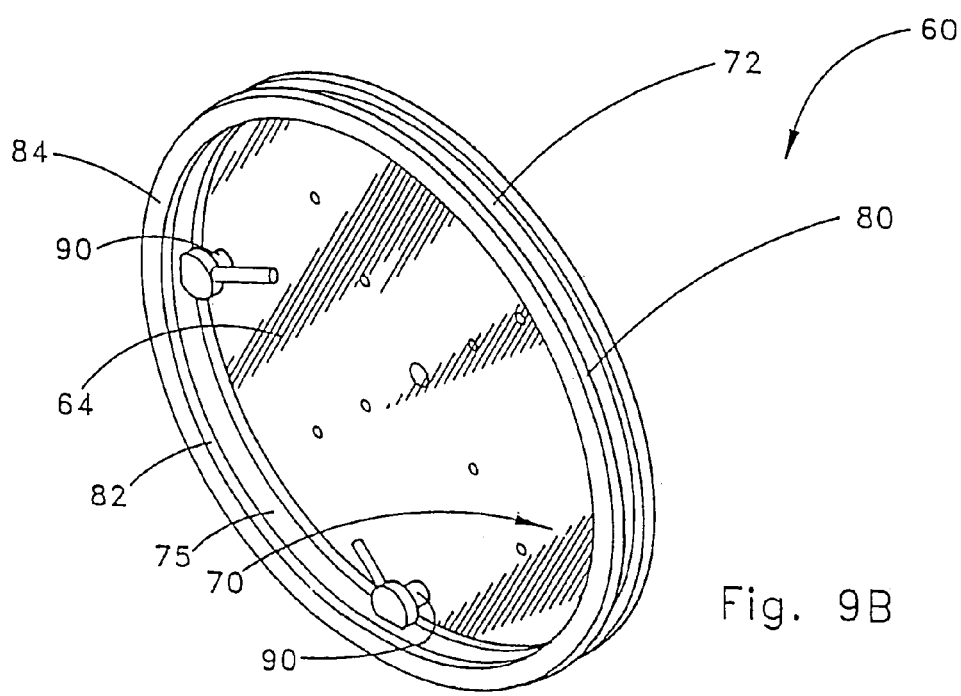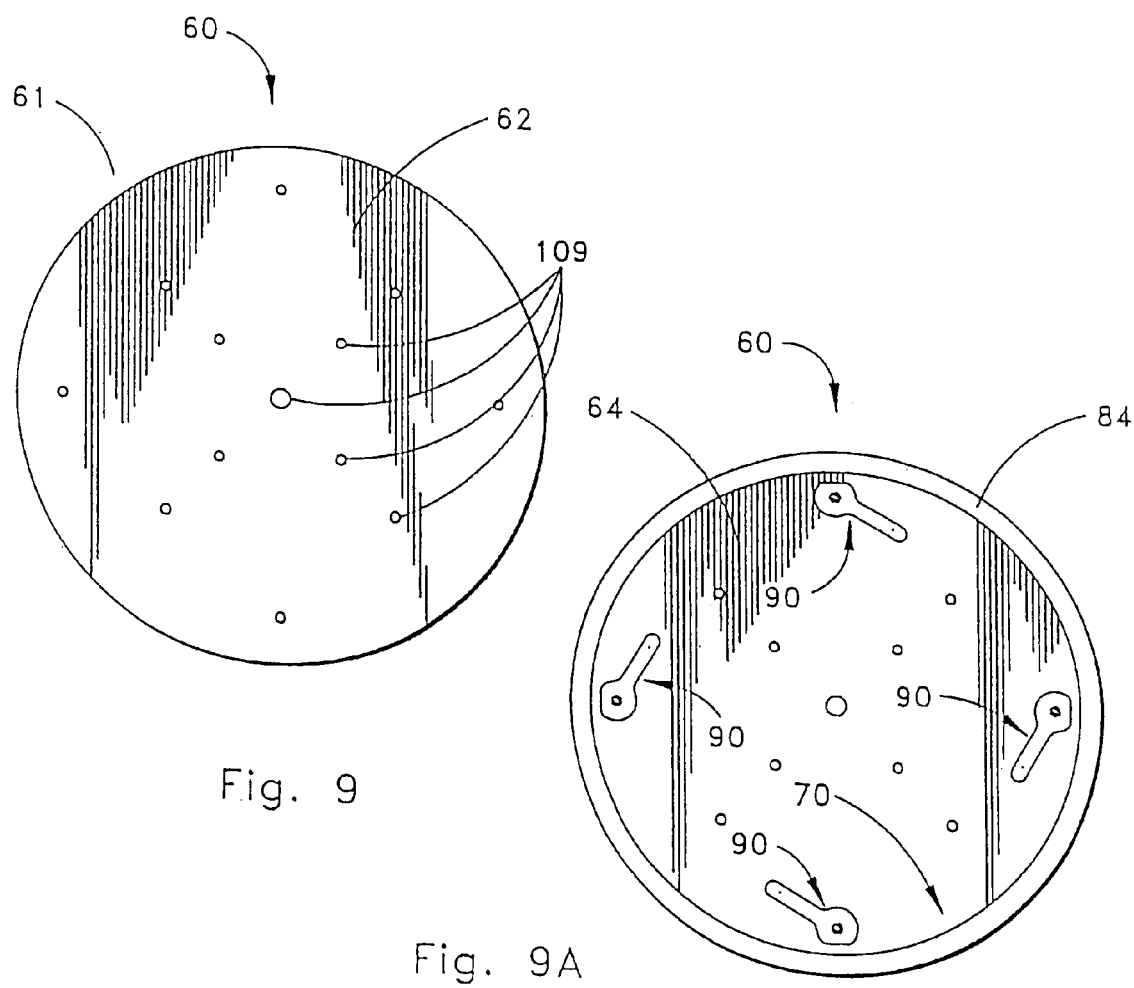
Fig. 9B
Fig. 9
Fig. 9A

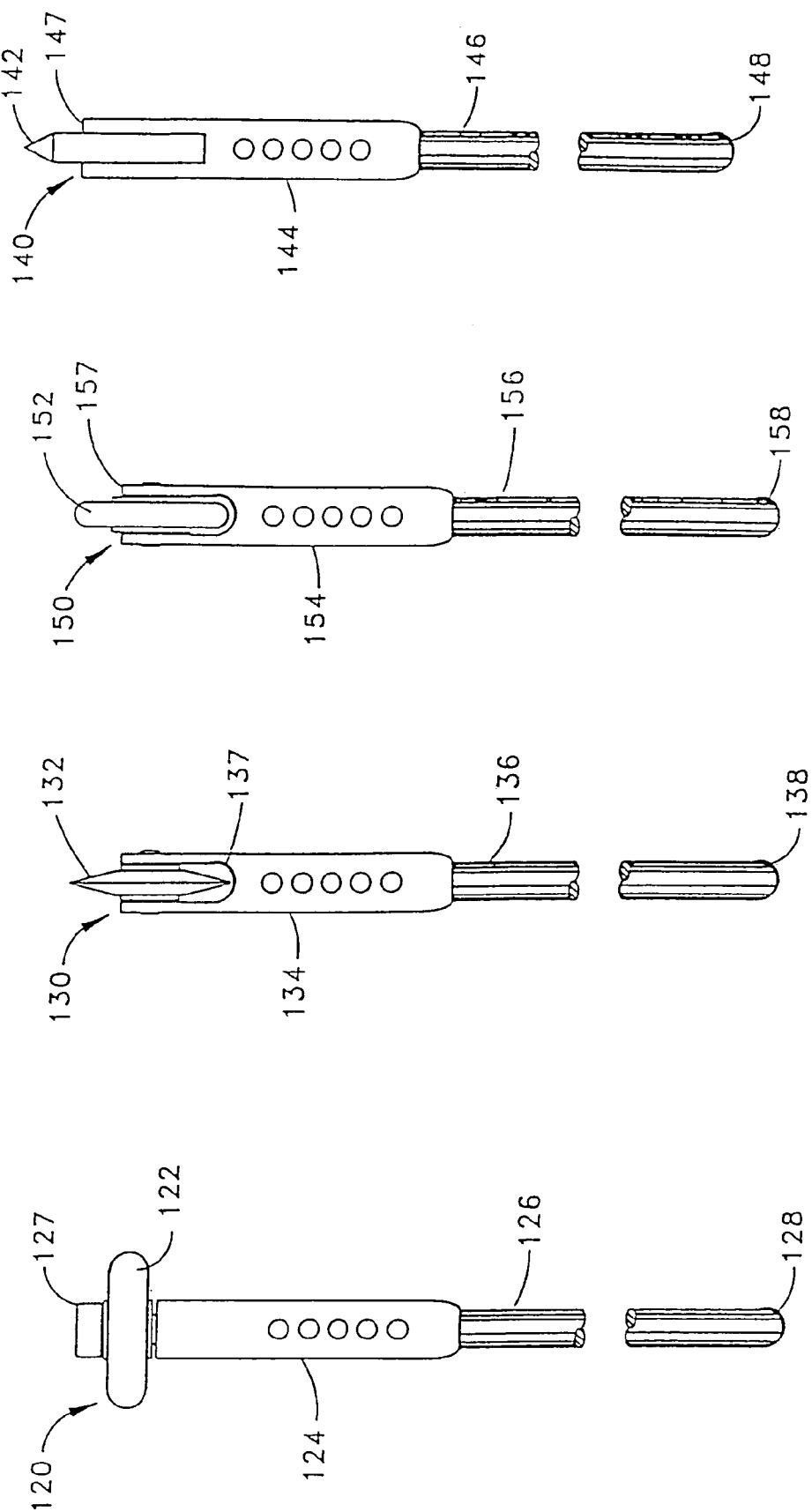

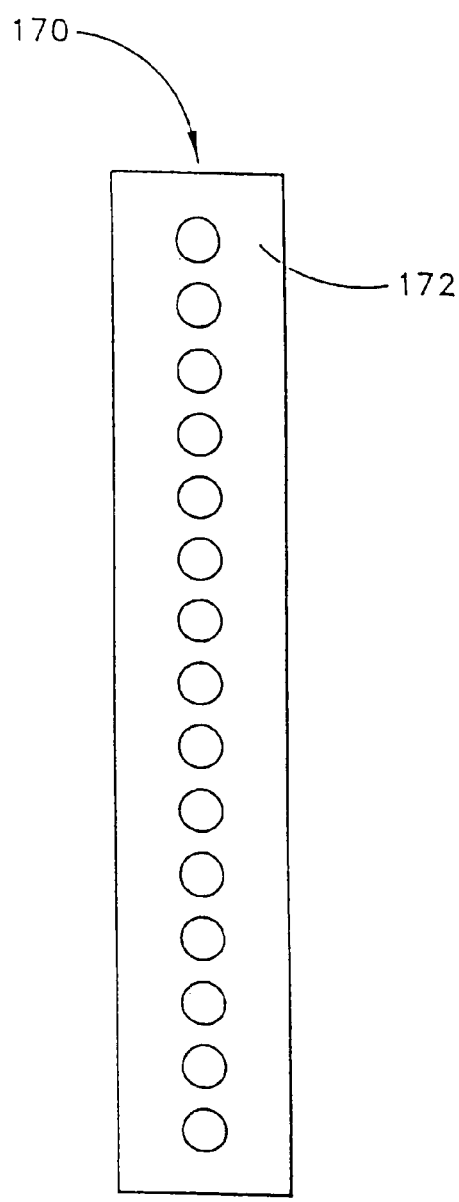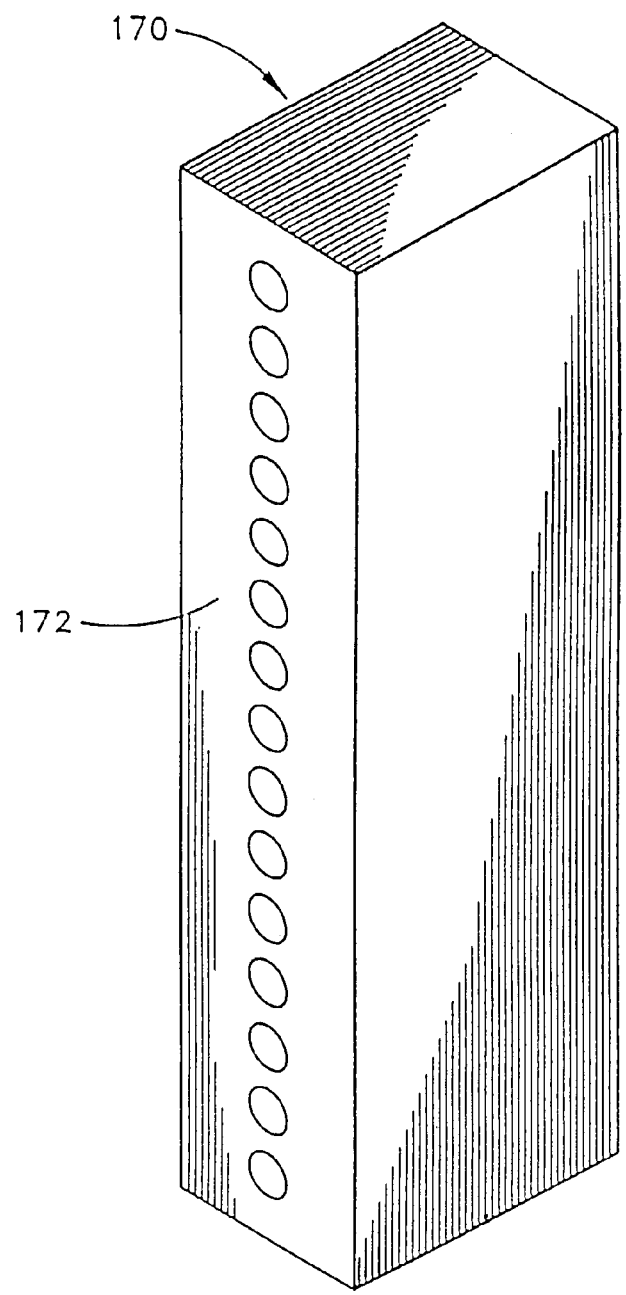
Fig. 17
Fig. 17A

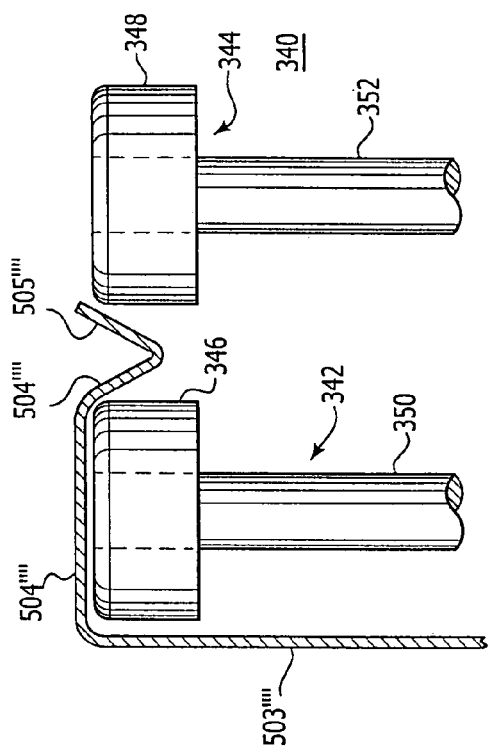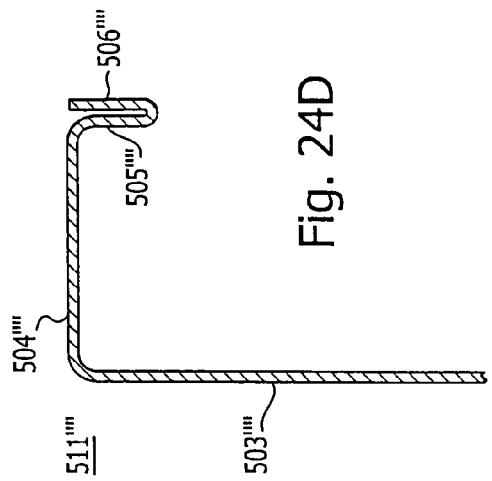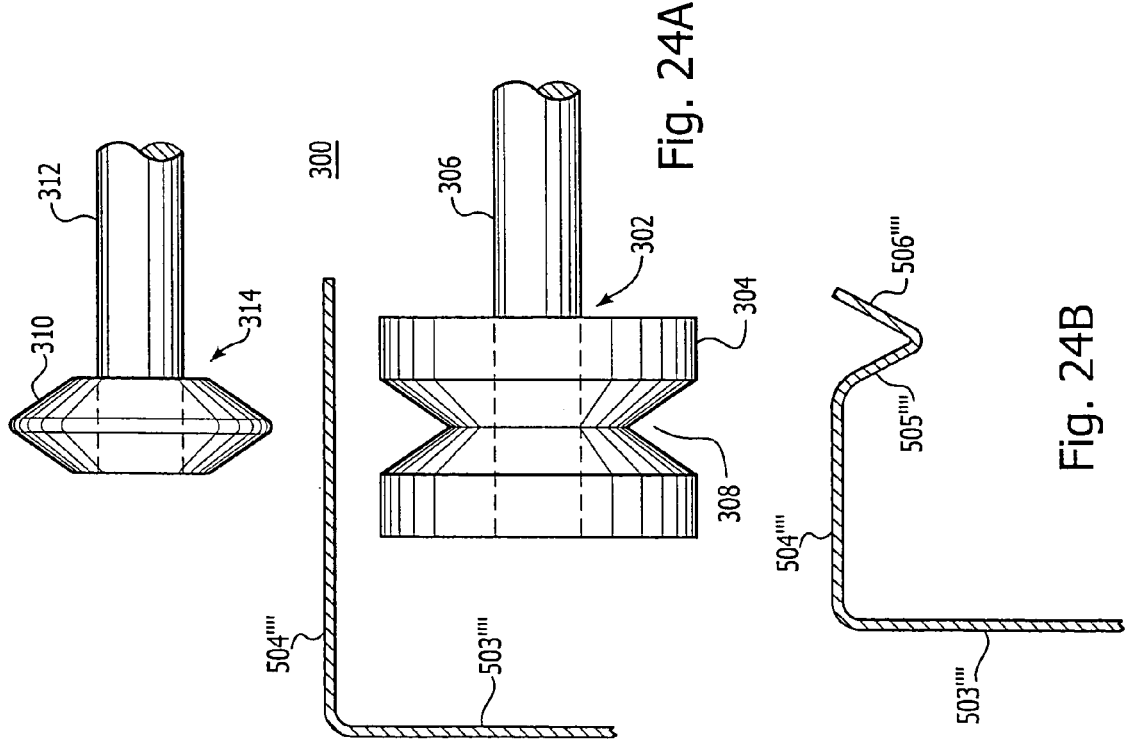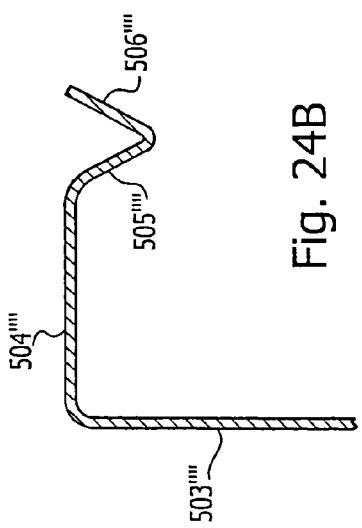
Fig. 24C
Fig. 24D
Fig. 24A
Fig. 24B

FLANGED CONNECTOR FOR HVAC DUCTING

CROSS-REFERENCES TO RELATED APPLICATIONS

This application is a continuation of prior application Ser. No. 10/067,726, filed Feb. 4, 2002 now abandoned, which claims the benefit of Provisional Application No. 60/266,087, filed Feb. 2, 2001. application Ser. No. 10/067,726 is also a continuation-in-part of application Ser. No. 09/956,745, filed Sep. 17, 2001 now abandoned, which is a continuation of application Ser. No. 09/484,741, filed Jan. 18, 2000 (now U.S. Pat. No. 6,289,706), which is a continuation-in-part of application Ser. No. 09/441,037 filed Nov. 16, 1999 (now U.S. Pat. No. 6,301,781), which is a continuation-in-part of application Ser. No. 08/616,655, filed Mar. 15, 1996 (now U.S. Pat. No. 5,983,496).

FIELD OF THE INVENTION

The present invention relates to circular and oval flanged rings for connecting double wall circular and oval heating, ventilation and air conditioning (HVAC) ducting sections, from thin gauge lock form quality steel, and a method for spin-forming such flanged rings.

BACKGROUND OF THE INVENTION

Joint assemblies are well known for the connection of the ends of adjacent rectangular, circular, and oval HVAC duct sections. U.S. Pat. No. 5,129,690, to Meinig, recites prior art relating to such assemblies and discloses an apparatus for connecting the ends of oval duct sections without disclosure of the method of making the apparatus; the patent does refer to U.S. Pat. No. 4,516,797, to Meinig, which discloses a one-piece flanged ring for connecting the ends of circular duct sections. U.S. Pat. No. 4,516,797 discloses a method for producing the flanged ring by contouring and then bending an elongated sheet-metal strip into an annular shape resulting in a flanged ring having an axial slit and claiming a method for producing a flanged ring characterized as an elongated sheet metal strip which is contoured and subsequently bent into annular form.

The machine method used to produce such a flanged ring is known to include roll forming. However, roll forming is limited generally to sheet-metal less than 10 gauge with roll forming causing tearing or breaking of sheet-metal in the production of flanged rings from thinner sheet-metal of gauge 10 or greater. Circular flanged rings, produced by roll forming, and thin-walled sheet-metal ducting generally do not have an absolutely circular cross section. The predominant means of manufacturing HVAC ducting is in the form of spiral seam tubes made up of helical wound sheet-metal strips with the strips interconnected by means of lock seams. The lock seams stand out from the outer duct face.

U.S. Pat. Nos. 4,516,797 and 5,129,690, to Meinig, are identified and disclosed in accordance with 37 C.F.R. § 1.97.

SUMMARY OF THE INVENTION

Objects of this invention are double wall circular and oval flanged rings from Lock Form Quality steel of gauge 10 to 20, for the connection of the ends of thin-, double-walled circular and oval sheet-metal tubes or ducting and how to make them by spinning, forming, and trimming, with standard machine tools and machining processes. The present invention is capable of making Flanged Rings that comply to the T24 flange profile and other profiles of the Sheet Metal and Air-Conditioning Contractors National Association (SMACNA). The method includes LFQ steel strips that may be rolled into flanged ring band stock strips having strip first and second ends which are butt welded together with a tungsten inert gas process with no filler. A spinning die, which is balanced and which has structural means or supporting structural member means, receives the flanged ring band stock which may be secured within the spinning die by appropriate means, for example by clamp means. The spinning die is rotated by means, for example by a lathe, and machine tools are employed to stretch, form and trim the flanged ring band stock to produce a first circular flanged ring. A second circular flanged ring may be produced by the same method in a second spinning die and then attached to the first circular flanged ring to form one double-wall circular or oval flanged ring for the connection of circular and oval thin gauged double-wall pipe or ducting sections.

One preferred embodiment of the flanged ring profile described herein constitutes the Sheet Metal and Air-Conditioning Contractors National Association (SMACNA) standard T24 Flange Profile. The profile disclosed is not limited to the SMACNA T24 profile. However, the method disclosed produces circular or oval flanged rings while the SMACNA T24 Flange Profile refers solely to flanges for the connection of rectangular ducting sections. This disclosure is the only known method of producing the SMACNA T24 Flange Profile for circular and oval flanged rings from 10 or greater gauge LFQ steel. The SMACNA T24 Flange Profile or cross section produced by the method described has an outer insertion flange portion which is secured within the spinning die by means including clamp means, an exterior mating flange portion which is stretched and formed and which meets and matches an opposing mating flange portion, an exterior hem portion which is formed, and a return flange, and an inner insertion flange portion which is secured within the second spinning die by means including clamp means, an interior mating flange portion which is stretched and formed and which meets and matches an opposing mating flange portion, and an interior hem portion which is formed.

The oval double-wall flanged ring is produced by cutting a circular, double-wall flanged ring along a diameter to produce approximately equal sized semi-circular flange ring portions. Equal length SMACNA T24 Linear Segments of the SMACNA T24 Flange Profile are produced, for instance by roll forming, and are welded to the semi-circular flanged ring portions to produce the oval flanged ring.

One preferred embodiment of the present disclosed method results in the production of the SMACNA T24 Flange Profile from 10 to 20 gauge Lock Form Quality steel (under 30,000 psi yield/tensile, galvanized G60; however, any metal which can be turned in the following described process and which can be welded may be used for production). The preferred embodiment of the described method requires the preparation of flanged ring band stock from 3.87511 wide 10 to 20 gauge LFQ steel. The material and material width may be varied as preferred.

An additional object of this invention is the formation of a circular, double-wall flanged ring which is more nearly circular in cross section than double-wall flanges produced by other means. The truer circular cross section facilitates the insertion of the circular flanged ring in the spiral-seam tubes comprising most circular and oval HVAC ducting. The method disclosed of making the circular double-wall flanged ring enables the use of much thinner gauge steel for the connection of duct section ends and in creating an airtight connection between duct section ends. The circular double-wall flanged ring, produced by a spinning process, is more uniformly circular in cross section than are flanges produced from a roll forming or press operation and more readily sealed, without elaborate gaskets.

In a further aspect of the present invention, the flange rings of the double-wall construction may be made in a two-step process with the mating flange portions being spin formed. The hem sections and/or the return flange are separately formed and then butt-welded or otherwise attached to the outer perimeter of the mating flanges. In another aspect of the present invention, the flanged rings can be manufactured by forming the insertion flanges as a singular component and then forming the mating flanges, hem sections and/or return flange as the second component, perhaps by roll forming or stamping. The two components can be assembled by welding the inside perimeter of the mating flanges to the end edge of the insertion flanges.

As a further aspect of the present invention, the flanged rings can be manufactured by spin forming the mating flanges in the manner described above. Thereafter, the hem sections can be formed by a roll forming method using roll forming dies. If a return flange is utilized, the hem section and return flange can both be formed from the material stock extending beyond the outer perimeter of the mating flanges, through the use of a series of roller sets.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a detail showing a cross section of the interrelationship of the Circular Flanged Ring inserted into ducting, of the Mating Flanges of opposing Circular Flanged Rings meeting in preparation for connection with Sealant depicted between the Mating Flanges.

FIG. 3 depicts circular Flanged Rings, inserted into ducting, of the Mating Flanges of opposing Circular Flanged Rings meeting in preparation for connection.

FIG. 4 is a detailed cross section depicting the connection of the Circular Flanged Ring from insertion flange to ducting and between Mating Flanges by screw means where Sealant is spread between the Mating Flanges.

FIG. 9 is an elevation view of the Mounting Surface of a Spinning Die.

FIG. 9A is an elevation view of the Working Surface of a Spinning Die showing the Collar, clamp means and threaded means for mounting purposes.

FIG. 9B is a perspective view of the Spinning Die.

FIG. 12 is a depiction of an Internal Roller machine tool with the Internal Roller Wheel having ideally about a ½" radius configured at 90 degrees to an axis through the Internal Roller Handle First to Second End.

FIG. 13 is a depiction of a Radius Roller with the Radius Roller Wheel having ideally about a ⅛" radius configured in line with an axis through the Radius Roller Handle First to Second End.

FIG. 14 is a depiction of a Finishing Roller with the Finishing Roller Wheel having ideally about a ½" radius configured in line with an axis through the Finishing Roller Handle First to Second End.

FIG. 15 is a depiction of a Trim Lever which provides ideally about a ½" square×3½" carbide insert Cutting Tip configured in line with an axis through the Trim Lever Handle First to Second End.

FIG. 17 is a plan view showing a Tool Rest which is affixed to a lathe cradle. The Tool Rest has a plurality of apertures which receive the Power Lever Bottom Surface Pin for positioning and working the machine tools in stretching, forming and trimming the Circular Flanged Ring.

FIG. 17A is a perspective showing the Tool Rest Top and a plurality of apertures which will receive the Power Lever Bottom Surface Pin.

FIGS. 24A, 24B, and 24C, and 24D illustrate a further method of forming the present invention.

DETAILED DESCRIPTION OF THE PREFERRED EMBODIMENT

While the preferred embodiment of the invention has been illustrated and described, it will be appreciated that various changes can be made therein without departing from the spirit and scope of the invention.

Figure 25:
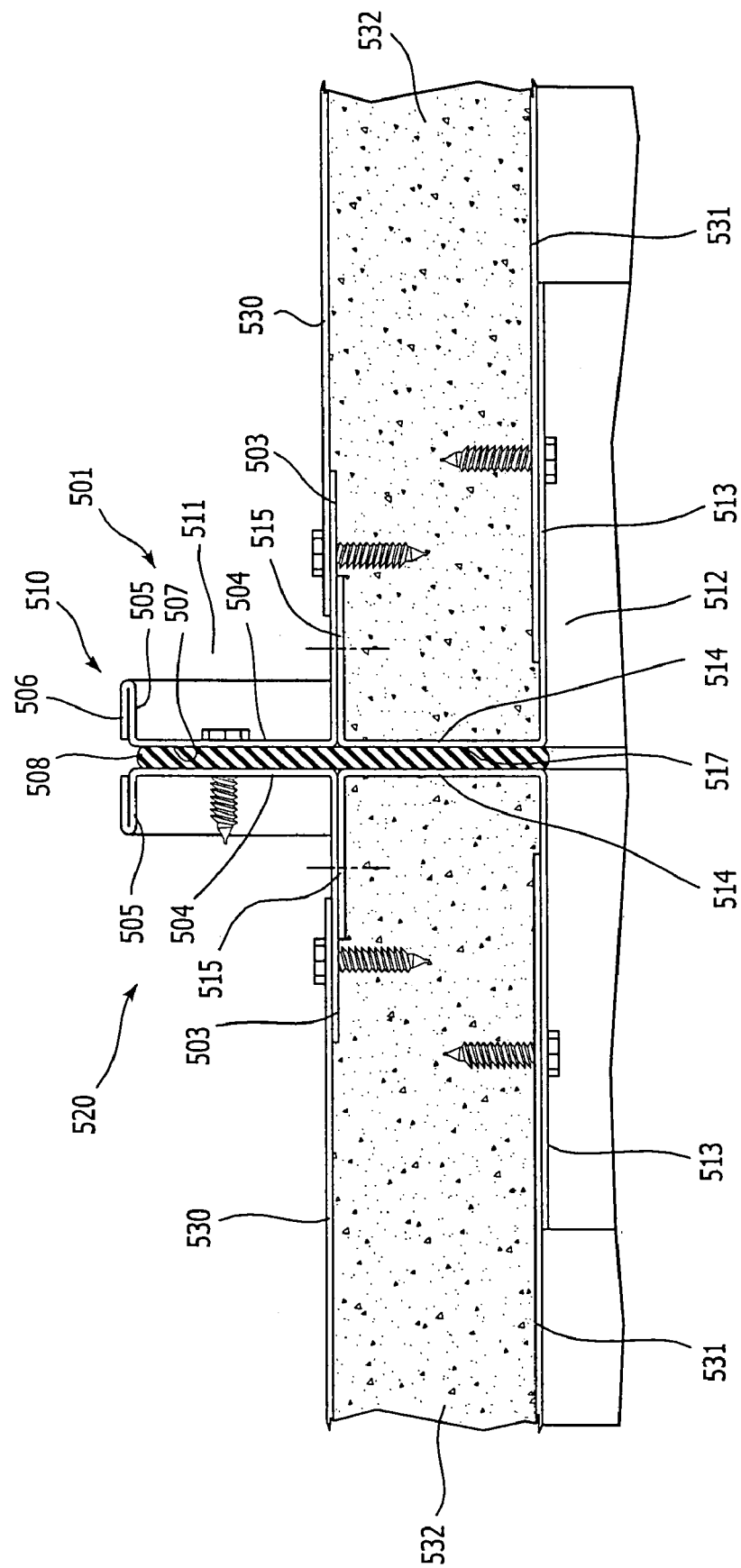
FIG. 25 is a further embodiment of the present invention.

The preferred embodiment, shown in FIG. 25, of the flanged ring profile 501 consists of a first cylindrical flanged ring 511 and a second cylindrical flanged ring 512 fastened together to form a single flange ring profile 501. The fastening means may consist of, but is not limited to, a welding means. A circular or oval flange ring 510 or 520 is attached to the double wall duct 532 in two locations.

The flange ring profile 501 is created by the joining of a first cylindrical flanged ring 511 and a second cylindrical flanged ring 512. The first cylindrical flanged ring 511 is composed of 10 gauge or greater metallic material. The first cylindrical flanged ring 511 has a cross section consisting of the following:

1) An outer insertion flange 503 that is of sufficient length to connect to the outer wall 530 of a double wall duct 532.

2) An exterior mating flange 504 that extends approximately 90° from the outer insertion flange 503. The exterior mating flange 504 defines a first mating face 507 that contacts the seal 508 when circular or oval flanged ring connectors 510, 520 are opposing each other and connecting two sections of double wall duct 532.

3) An exterior hem 505 that extends outwardly from, and is approximately concentric with, the outer mating flange 504. The exterior hem 505 may extend from the exterior mating flange 504 in generally the same direction as the outer insertion flange 503. Of course, the hem 505 need not define a cylindrical shape.

4) An optional return hem 506 may be formed by folding a portion of the exterior hem 505 located distally from the exterior mating flange 504 over upon itself. The return hem 509 may be substantially flattened against exterior hem 505 or may be in other configurations. Also, the exterior hem 505 and return hem 506 may together define various cross-sectional shapes such as round, oval, elliptical, etc., and thus may have a hollow interior. Rather than being hollow, the interior defined by the round, oval, or elliptical cross section may be filed with a circular-shaped rod or ring member for additional strength.

The second cylindrical flanged ring 512 is composed of 10 gauge or greater metallic material. The second cylindrical flanged ring 512 has a cross section consisting of the following:

1) An inner insertion flange 513 that is of sufficient length to connect to the inner wall 531 of a double wall duct 532.

2) An interior mating flange 514 that extends approximately 90° from the inner insertion flange 513. The interior mating flange 514 defines a second mating face 517 that contacts the seal 508 when circular or oval flanged ring connectors 510, 520 are opposing each other and connecting two sections of double wall duct 532.

3) An interior hem 515 that is approximately concentric with the inner mating flange 513. The interior hem 515 extends from the interior mating flange 514 in the same direction as the inner insertion flange 513. The interior hem 515 extends from the interior mating face a sufficient distance to allow connection with the first cylindrical flanged ring 511 yet not to interfere with the connection of the outer insertion flange 503 and the outer wall 530 of a double wall duct 532.

The flanged ring profile 501 is completed when the first cylindrical flanged ring 511 is fastened to the second cylindrical flanged ring 512. The first cylindrical flanged ring 511 is aligned with the second cylindrical flanged ring 512 so that the exterior mating flange 504 and the interior mating flange 514 form one plane. The connection may by accomplished by welding, but is not limited to that method of fastening. Two sections of double wall duct may now be connected. The outer insertion flange 503 is attached to the inner diameter of the outer wall 530 of the double wall duct 532. The inner insertion flange 513 is attached to the inner diameter of the inner wall 531 of the double wall duct 532. Two opposing circular or oval flange rings 510, 511 are attached with a seal 508 being trapped between the first and second mating surfaces 507, 517.

Figure 10:
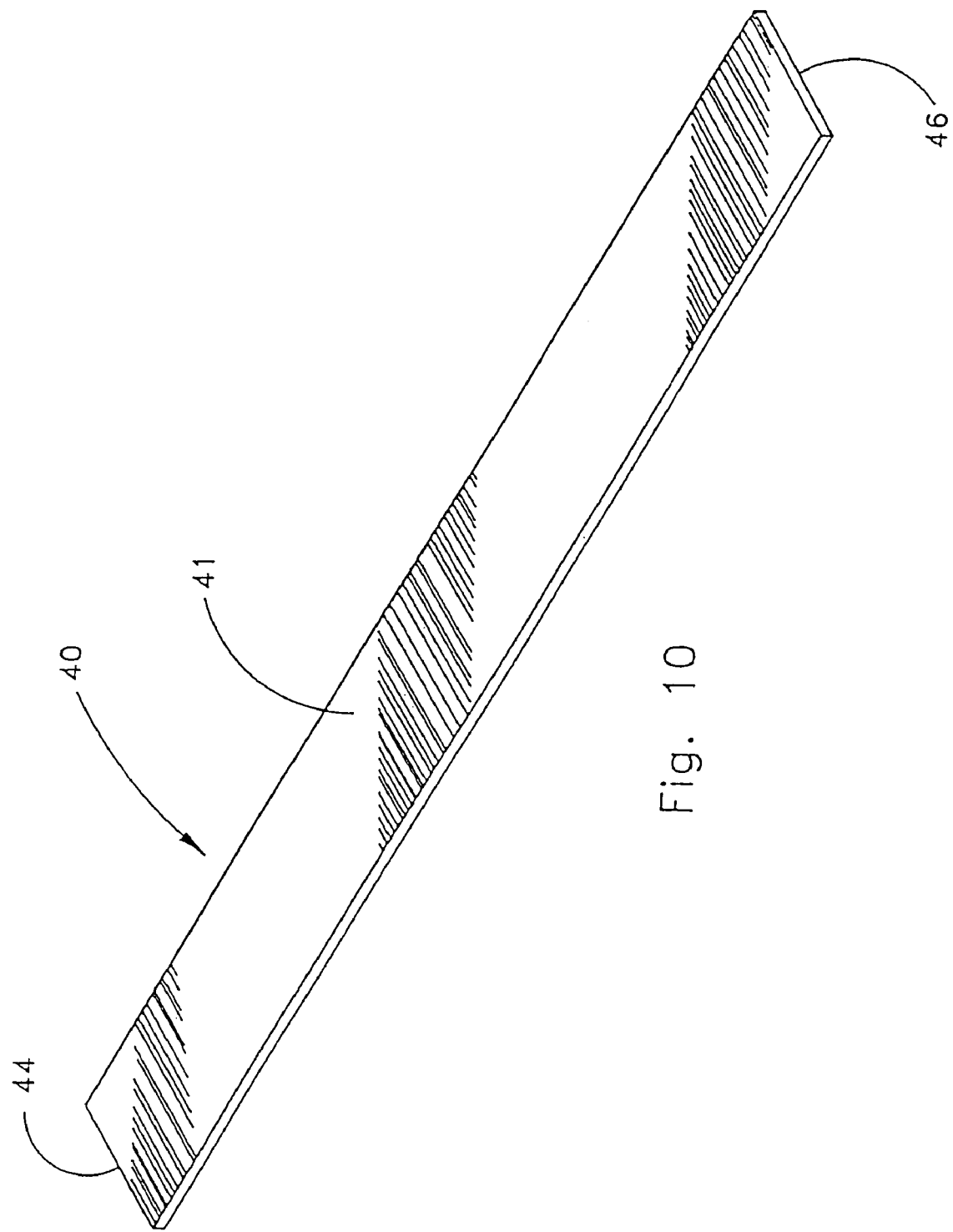
FIG. 10 is a perspective view of a Flanged Ring Band Stock Strip of LFQ steel cut to length in preparation for rolling into a band or circular form.
Figure 10B:
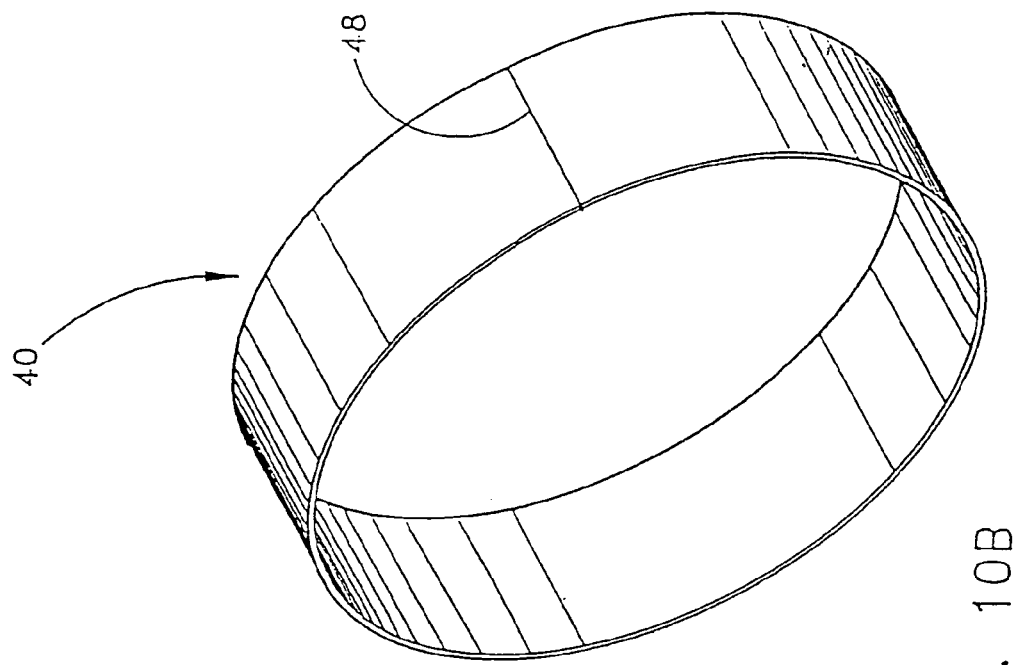
FIG. 10B is a perspective view of a Flanged Ring Band Stock which has been butt welded and is ready for insertion into a Spinning Die in preparation for spinning, stretching, forming and trimming into a Circular or Oval Flanged Ring.
Figure 10A:
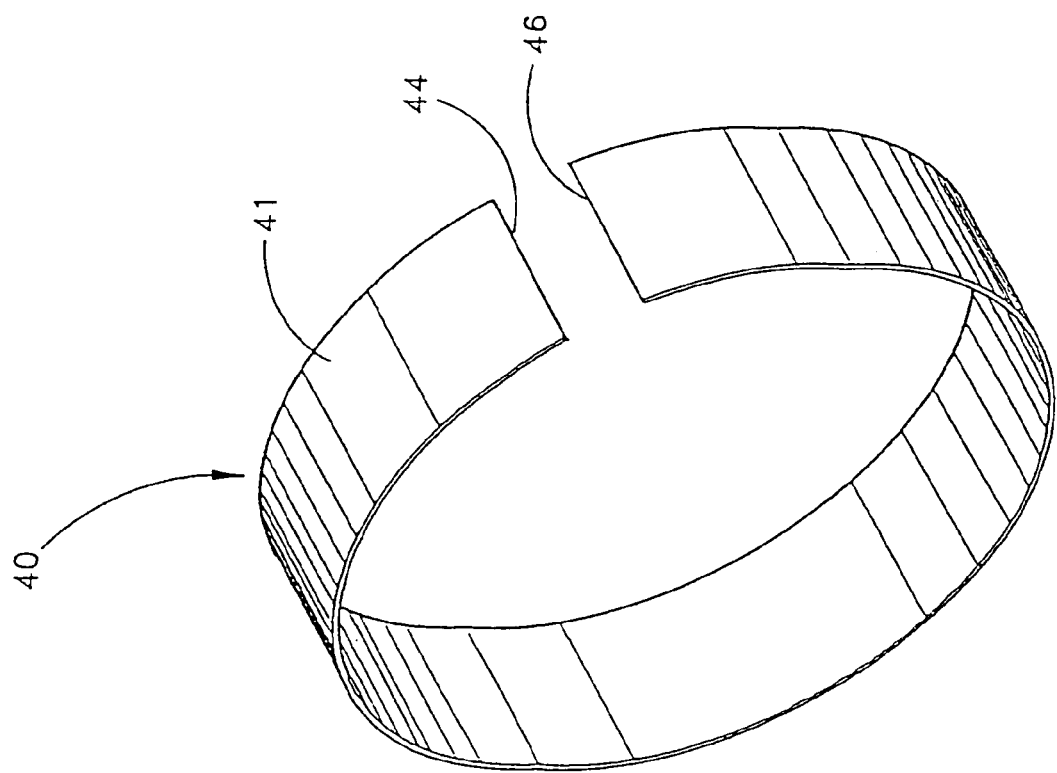
FIG. 10A is a perspective view of a rolled strip of LFQ steel formed into a band shape with Strip First and Second Ends ready to be butt welded together.
Figure 11:
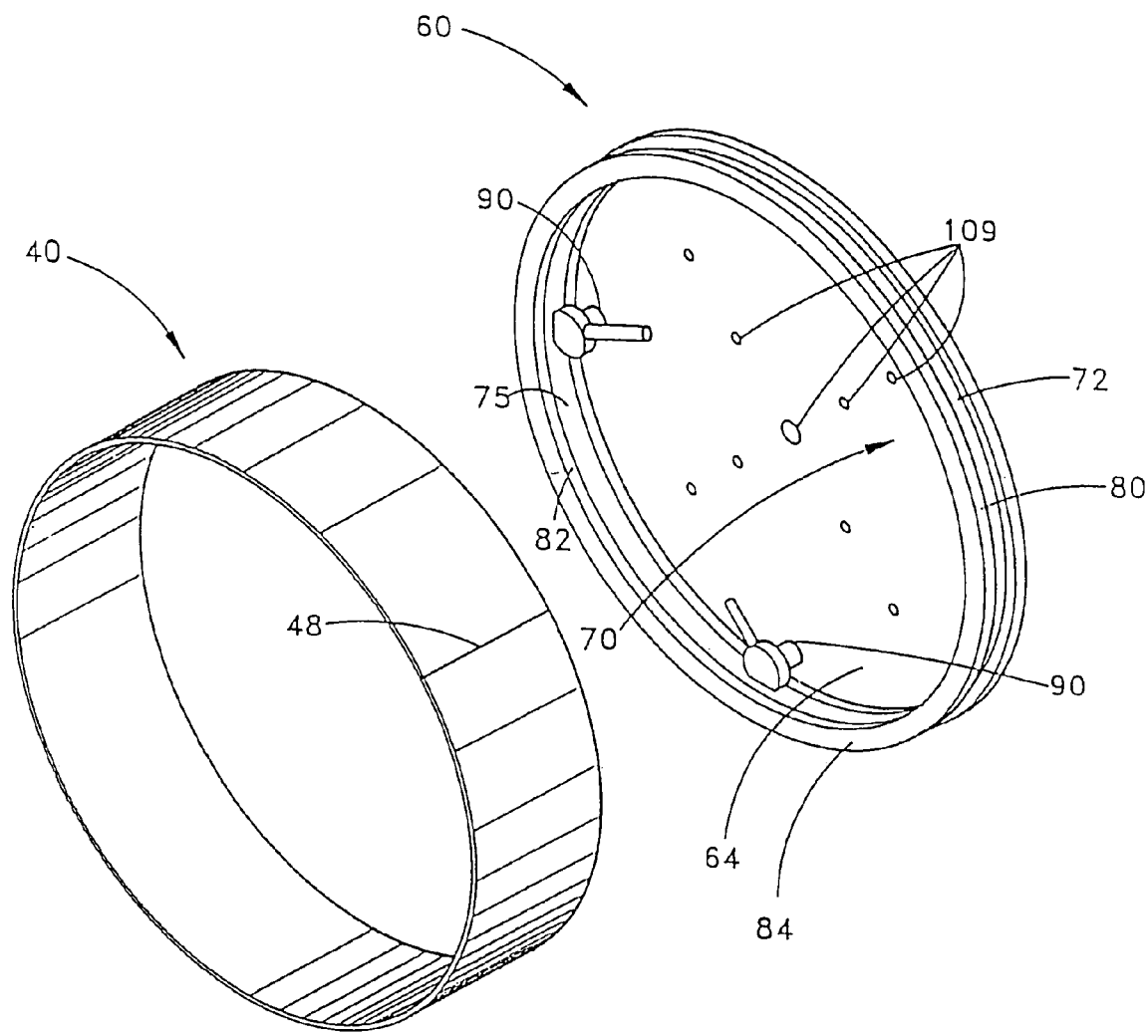
FIG. 11 is a perspective showing the Flanged Ring Band Stock and the Spinning Die.
Figure 11A:
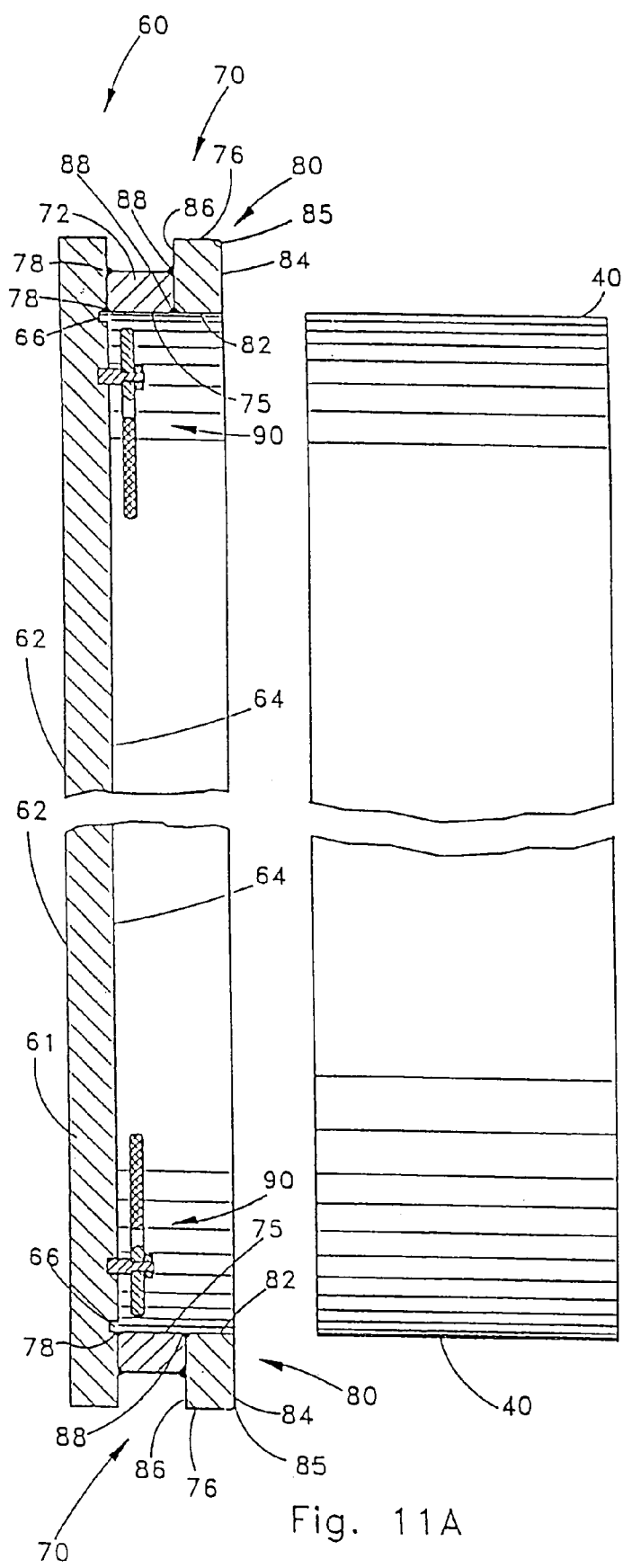
FIG. 11A is a side view of a Flanged Ring Band Stock prepared to be inserted and secured in a Spinning Die.
Figure 11B:
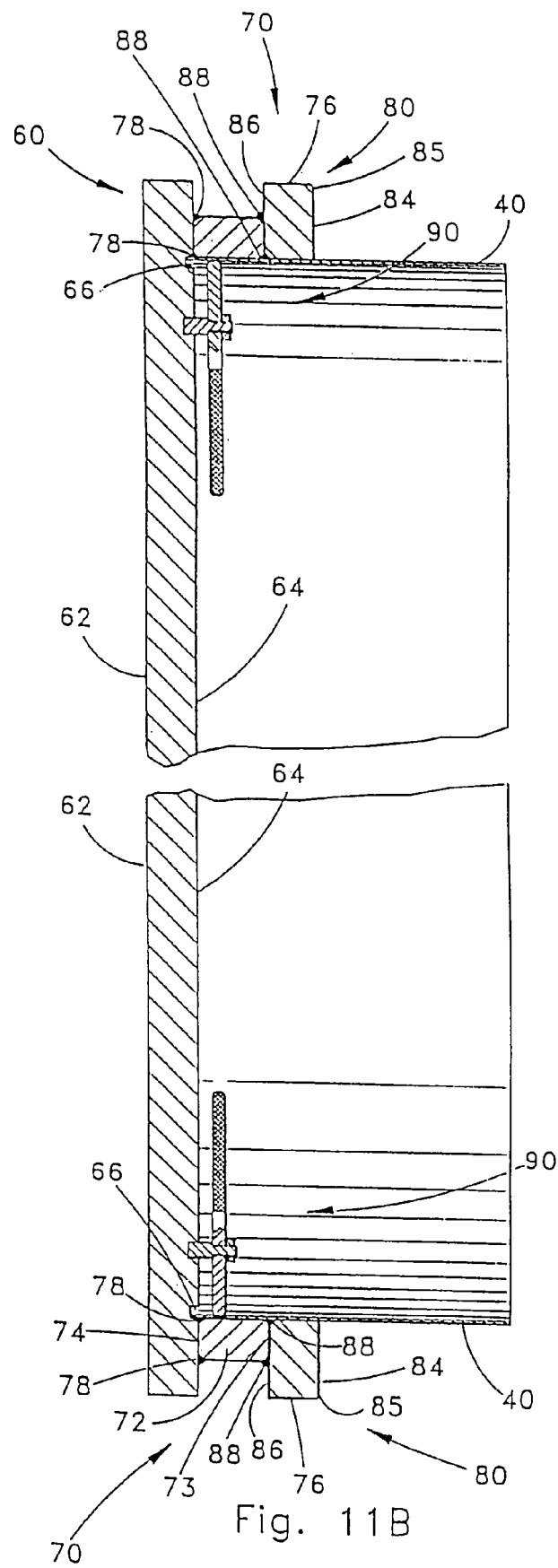
FIG. 11B is a side view of a Flanged Ring Band Stock in the inserted position within a Spinning Die in preparation for machining steps directed to the production of a Circular Flanged Ring.
Figure 11C:
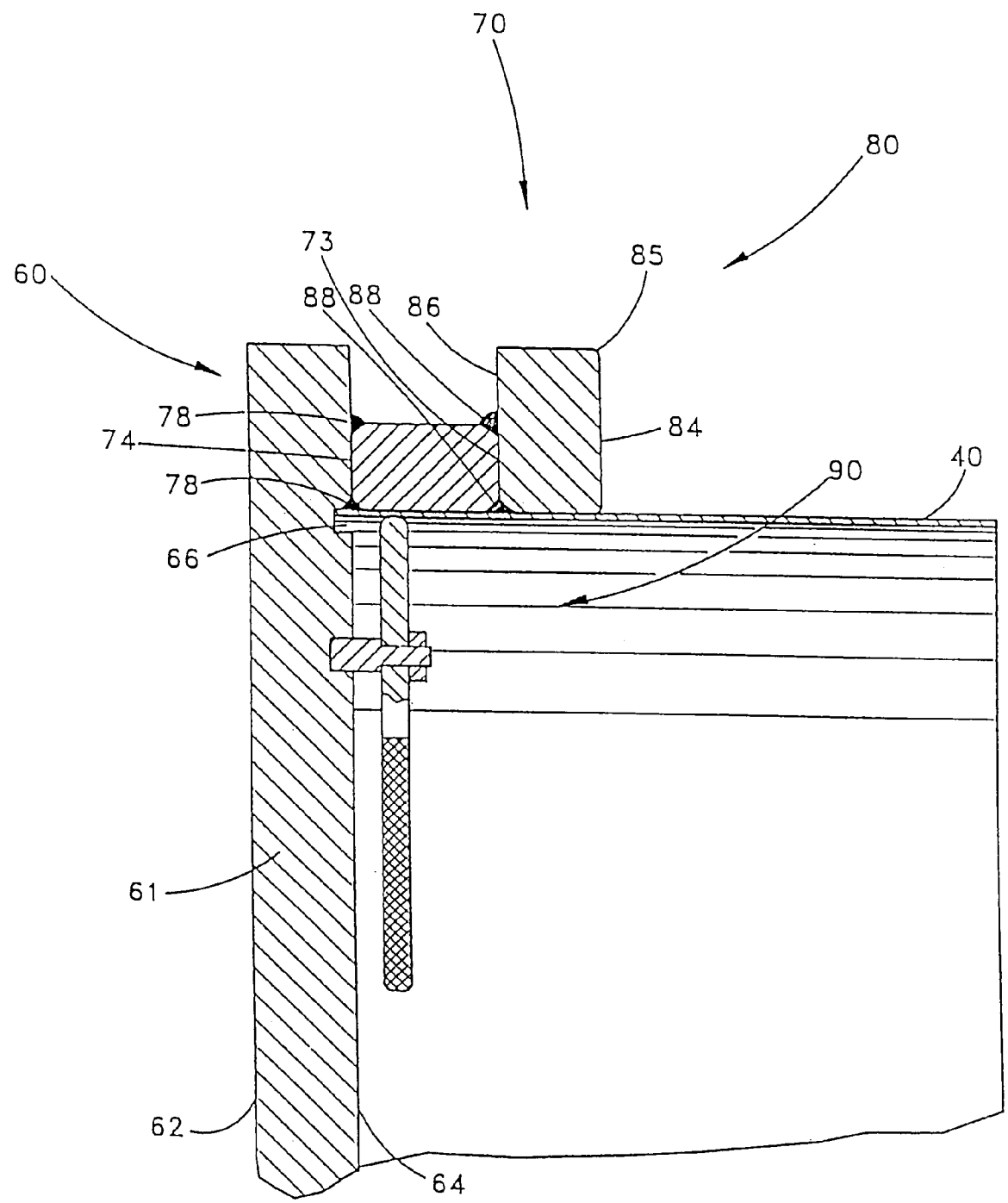
FIG. 11C is a detail view showing a portion of the Spinning Die including the Collar and Collar components (Collar Strip and Mating Strip), a Flanged Ring Band Stock received by the Collar and into the Working Surface Groove and secured by a Cam Clamp.

One preferred embodiment of making the disclosed Circular Flanged Rings 510, 512 includes the following materials, steps and process: LFQ steel, or other Flanged Ring Band Stock 40 material, is normally received in coil form and is decoiled and cut into Flanged Ring Band Stock Strips 41 having Strip First and Second Ends 44, 46, as shown in FIG. 10, the length of the circumference of the Circular Flanged Rings 510, 512 to be produced (Flanged Ring Band Stock Strips 41 of widths other than 3.875" may also be used with the width limited by the configuration of the Spinning Die 50 and the dimensions of the desired Circular Flanged Rings 510, 512). Each Flanged Ring Band Stock Strip 41 is formed into a band form, which is substantially circular as shown in FIG. 10A, for ease of affixing the Strip First and Second Ends 44, 46 together, for example, by butt welding the Strip First and Second Ends 44, 46 together, with the band forming accomplished by means, for example, with a rolling machine including a pyramid rolling machine. The preferred means of connection of the Strip First and Second Ends 44, 46 is by butt welding by use of a tungsten inert gas process with no filler. The butt welding forms the Strip First and Second End Weld 48 and concludes the formation of the Flanged Ring Band Stock 40 as shown in FIG. 10B. It is important, for successful spinning and forming of the Circular Flanged Rings 510, 512, that the butt weld of the Strip First and Second Ends 44, 46 not produce a seam. Any seam, ridge, irregularity or any fill in the weld will increase the probability of the seam cracking, as the Flanged Ring Band Stock 40 is stretched in the spinning process, ruining the Flanged Ring Band Stock 40 and creating a safety hazard. The Flanged Ring Band Stock 40 will be received within and secured into a Spinning Die 60 as shown in FIGS. 10, 10A and 10B.

The disclosed process requires two workpieces of Flanged Ring Band Stock 40 to be rotated or spun for forming and trimming and then fastened together. Each Flanged Ring Band Stock 40 may be fixed in a die which is in turn rotated or spun for presentation to and work by various machine tools. The rotation of the die means and Flanged Ring Band Stock 40 may be accomplished, for example, by a lathe with either a vertically or a horizontally mounted Lathe Output Shaft 50. The preferred embodiment, for example, utilizes a lathe with a horizontally mounted Lathe Output Shaft 50 to which is mounted, via adapter and/or mounting means, a Spinning Die 60.

The die means may be provided, for example by a Spinning Die 60 shown in FIGS. 9, 9A, and 9B, which in the preferred embodiment, may consist of a circular Base Plate 61 formed from approximately 1" thick mild steel plate having a Mounting Surface 62 and a Working Surface 64 and an outside diameter approximately 1" greater than the outside diameter of the Flanged Ring Band Stock 40 which is selected for forming and trimming. Mounting means may be provided which enable the Lathe Output Shaft 50 to be located at the effective center of the Mounting Surface 62. On the Working Surface 64 of the Base Plate 61, a die means or fixture receives and secures the Flanged Ring Band Stock 40 and may be provided, for example, by a Collar 70 assembled from components consisting of: 1) a Collar Strip 72 consisting of 3/8" thick×2" wide mild steel strip which is rolled to a 2" wide strip in a circular form having an inside diameter approximately 1/16" greater than the outside diameter of the Flanged Ring Band Stock 40 and with the strip width of approximately 2". The Collar Strip 72 has End Edges 73, 74. The End Edge 74 may be tack-welded to the Working Surface 64 of the Base Plate 61 so that the Collar 70 and Spinning Die 60 are concentric around the center of the Spinning Die 60. The interior perimeter of the Collar 70, between the End Edges 73, 74, forms the Insertion Face 76; 2) A Working Surface Groove 66, 1/16"×1/16", may be machined into the Working Surface 64 of the Base Plate 61 at the intersection of the Collar Strip End Edge 74 and the Working Surface 64. The Working Surface Groove 66 has an outside diameter equal to the inside diameter of the Insertion Face 76 and inside diameter ideally about 1/3" less than the inside diameter of the Insertion Face 76. The Working Surface Groove 66 accepts the inserted edge of the Flanged Ring Band Stock 40; 3) A 1/2" thick×1 3/8" wide mild steel Mating Strip 80 in a circular form has a Mating Surface 84, Mating Strip Bottom 86, a Mating Surface/Hem Edge 85, and a Mating Face 82 at the interior perimeter of the Mating Strip 80. The Mating Strip 80 may be a flat burned arc with an inside diameter at the Mating Face approximately about 1/16" greater than the Flanged Ring Band Stock 40 and is tack welded to the Collar Strip End Edge 73 distal from the Working Surface 64 such that the 1 3/8" wide surface of the Mating Surface 84 is parallel to the Working Surface 64; 4) the Collar 70 assembly may be continuously welded between the Collar Strip End Edge 74 and the Working Surface 64 (Collar Strip Second Edge Weld 78) and between the Collar Strip End Edge 73 and the Mating Strip Bottom 86 (Mating Strip Bottom Weld 88) via the mig welding process. The Collar 70 or die or fixture means, receiving the Flanged Ring Band Stock 40, may be provided by means other than described, including machining or constructing from a single component or other combinations of components and may have a variety of dimensions depending on the final intended dimensions of the Circular or Oval Flanged Ring 10, 20 to be produced.

Clamping means, including for example Cam Clamps 90, as shown in FIGS. 9A, 9B, 11, 11A and 11B, may be affixed to the Working Surface 64 of the Base Plate 61 and positioned to rotate and bind the inserted Flanged Ring Band Stock 40 between the clamp cam and the inner perimeter of the Insertion Face 75, thus securing the Flanged Ring Band Stock 40 between the Cam Clamp 90 and the inner perimeter during the spinning, forming and trimming process. Depending upon the size of the Circular or Oval Flanged Rings 510, 512 to be produced, there will be at a minimum two Cam Clamps 90 for 14" diameter Circular Flanged Rings 510, 512 and up to eight or more Cam Clamps 90 for 60" diameter Circular Flanged Rings 510, 512.

The Spinning Die 60 means will be balanced and will have material strength sufficient to permit smooth and safe rotation up to and exceeding 3,000 rpm. Machining or other steps may be necessary to help ensure that the Spinning Die 60 and all structural means or supporting structural member means are truly round and balanced in all axes in order to minimize vibration. The Spinning Die 60 structure may, for example, include the Spinning Die 60, a circular Adapter Plate 100 and a circular Backing Plate 110 with means for securing concentrically the Adapter Plate 100 to the Lathe Output Shaft 50 and the Adapter Plate 100 to the Base Plate 61 Mounting Surface 62. For the production of Circular Flanged Rings 42" diameter and greater, means for concentrically securing, for structural stability, the Backing Plate 110 between the Adapter Plate 100 and the Spinning Die 60. The Adapter Plate 100, for example, may be composed of a 1/2" thick circular steel plate 14" in diameter having an Adapter Plate Obverse and Reverse Sides 102, 104 and having a fixture means, at the Adapter Plate Reverse Side 104, for concentric attachment to the Lathe Output Shaft 50 including threaded means which may be, for example, a Hub 107 providing a female thread for mating with a Lathe Output Shaft 50. The Adapter Plate 100 may, for example, have means for concentric attachment to the Mounting Surface 62 of the Base Plate 61 including Bolt Apertures 109 from the Adapter Plate Reverse to Obverse Sides 104, 102 having therein threaded means with the Bolt Apertures 109 symmetrically positioned in a pattern which will be mirrored and matched by Bolt Apertures 109 from the Mounting Surface to the Working Surface 64 of the Base Plate 61. The additional mass involved in the Spinning Die 60 for Circular Flanged Rings 510, 512 of 42" diameter and greater may require additional structural stability which may be provided, for example, by the utilization of a Backing Plate 110 comprised of a 1" thick circular steel plate 42" in diameter having Backing Plate Obverse and Reverse Sides 111, 112 and mounting means for concentrically mating with the Adapter Plate 100 and the Spinning Die 60. Mounting means for the Backing Plate 110 may include, for example, Bolt Apertures 109 from the Backing Plate Obverse to Reverse Side 111, 112 having threaded means therein and symmetrically positioned on a pattern which will be mirrored and matched by Bolt Apertures 109 for the Adapter Plate 100 and the Spinning Die 60.

Two separate spinning dies 60 are required to form a circular or oval flanged ring connector 510, 520 to be used to join double wall ducts 532. A first spinning die may be selected in accordance with the diameter of the first cylindrical shaped ring to be formed. A second spinning die may be selected in accordance with the diameter of the second circular shaped ring to be formed. A spinning die 60 is mounted, by mounting means, on rotation means including a lathe output shaft 50. The first workpiece in the form of a flanged ring band stock 40 may be inserted in the spinning die 60 against and received by the insertion face 75 and the mating face 82 and into the working surface groove 66, where it may be secured by means including clamp means provided, for example, by cam clamps 90. The flanged ring band stock 40 may be rotated in preparation for the forming and trimming process.

The forming and trimming of the first flange ring involves standard machine tools and stabilizing devices including:
  an internal roller 120, as shown in FIG. 12, having an internal roller wheel 122 comprising a wheel having a perimeter consisting of a convex wheel working surface and pivot means attached by means to an internal roller tool fixture 124 provided, for example, by an internal roller handle 126 permitting the wheel to rotate in a plane 90° to a longitudinal axis from an internal roller handle first and second ends 127, 128 when the wheel working surface is in contact with a mating flange 504, 514 portion of the flanged ring band stock 40 when clamped into the spinning die 60 (the internal roller 120 for the preferred embodiment of the disclosed method has a convex working surface with a ½" radius and an internal roller handle 126 proximal to the internal roller wheel 122 has five ¾" diameter holes spaced equally 1¼" apart);

(2) a radius roller 130, as shown in FIG. 13, having a radius roller wheel 132 comprising a wheel having a perimeter consisting of a convex wheel working surface and pivot means attached by means to a radius roller tool fixture 134 provided, for example, by a radius roller handle 136 permitting the wheel to rotate in a plane parallel to a longitudinal axis from a radius roller handle first and second ends 137, 138 when the wheel working surface is in contact with a hem portion 505, 515 of the flanged ring band stock 40 when clamped into the spinning die 60 (the radius roller wheel 132 for the preferred embodiment of the disclosed method has a convex working surface with a ⅛" radius and the radius roller handle 136 proximal to the radius roller wheel 132 has five ¾" diameter holes spaced equally 1¼" apart);

(3) a trim lever 140, as shown in FIG. 15, comprising a cutting tip 142 affixed to a trim lever tool fixture 144 provided for example by a trim lever handle 146 permitting the cutting tip 142 to extend parallel with a longitudinal axis from the trim lever handle first to second ends 147, 148 with the cutting tip for cutting or trimming the exterior hem 505 as the step preliminary to the production of the return flange 506 (the cutting tip 142 for the preferred embodiment of the disclosed method has a ½" square×3½" long carbide cutting tip and the trim lever handle 146 proximal to the cutting tip 142 has five ¾" diameter holes spaced equally 1¼" apart);

(4) a finishing roller 150, as shown in FIG. 14, having a finishing roller wheel 152 having a perimeter consisting of a convex wheel working surface and pivot means attached to a finishing roller tool fixture 154 provided, for example, by a finishing roller handle 156 permitting the finishing roller wheel 152 to rotate in a plane parallel to a longitudinal axis from a finishing roller handle first and second ends 157, 158 when the wheel working surface is in contact with the return flange 506 portion of the flanged ring band stock 40 when clamped into the spinning die 60 (the finishing roller wheel 152 for the preferred embodiment of the disclosed method has a convex working surface with a ½" radius and the finishing roller handle 156 proximal to the finishing roller wheel 152 has five ¾" diameter holes spaced equally 1¼" apart).

Figure 16B:
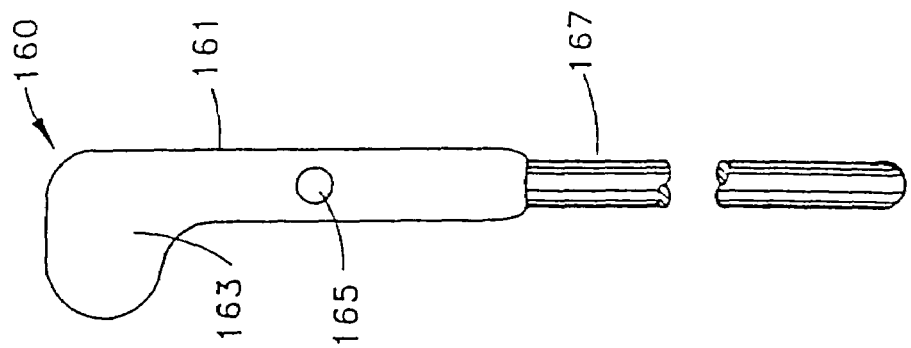
FIG. 16B is a bottom view showing the Power Lever Head and Power Lever Bottom Surface Pin.
Figure 16A:
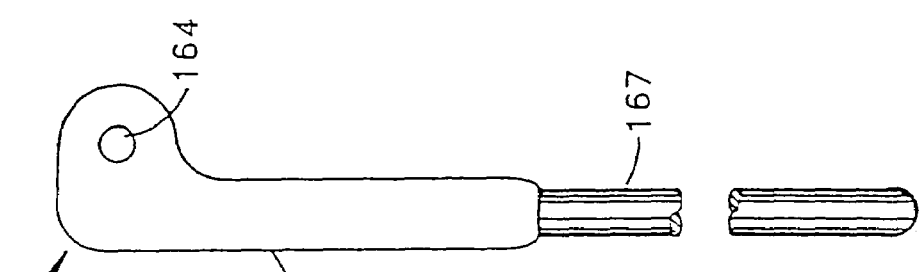
FIG. 16A is a plan view showing the Power Lever Head and Power Lever Top Surface Pin.
Figure 16:
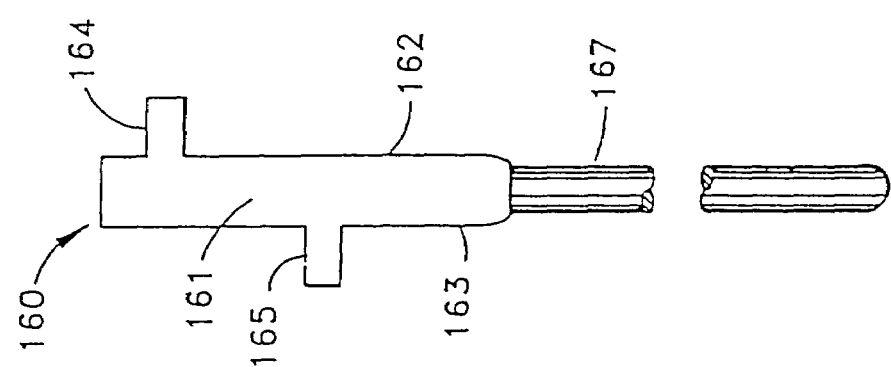
FIG. 16 is a side view of a Power Lever from which all other machine tools employed herein are operated to obtain leverage for the stretching, forming and trimming operations. Top Surface and Bottom Surface Pins are depicted.

The internal roller 120, radius roller 130, trim lever 140, and finishing roller 150 are urged against the appropriate portions of the flanged ring band stock 40 by machining process means, including by manual/hand manipulated means, automated machine tool means operated and controlled by computers and computer programs, and other process control systems and other machine tool processes. Leverage, to manually urge the above machine tools in their function may, for example, be facilitated by the following:

(1) Tool rest 170, as shown in FIG. 17, which is mounted in a position opposing the rotating spinning die 60 at a position where the indicated machine tools may be brought into contact with the flanged ring band stock 40 and undertake the machining steps described. The tool rest 170 may be mounted, for example, on a lathe cradle opposing the spinning die 60 within which the various machine tools will operate on a flanged ring band stock 40. The tool rest 170 consists, in the preferred embodiment, of a mild steel block 37" long×3" thick×4" wide with the tool rest top 172 having 30 apertures sized to receive a ¾" diameter pin and spaced 1⅛" apart along the length of the tool rest top 172;

(2) A power lever 160, as shown in FIGS. 16, 16A, and 16B comprising a power lever head 161 having a power lever head top and bottom surface 162, 163, a top surface pin 164 ¾" diameter×¾" long extending from the power lever head top surface 162, and a bottom surface pin 165 ¾" diameter×¾" long extending from the power lever head bottom surface 163. The top and bottom surface pins 164, 165 are ideally parallel to an offset from each other. The power lever head 161 is affixed to a tool fixture provided, for example, by a power lever handle 167. The power lever 160 is used, in the manual/hand production procedure, to provide the pivot point about which the machine tools are operated to attain the leverage required to form, stretch, and trim the flanged ring band stock 40.

Figure 19:
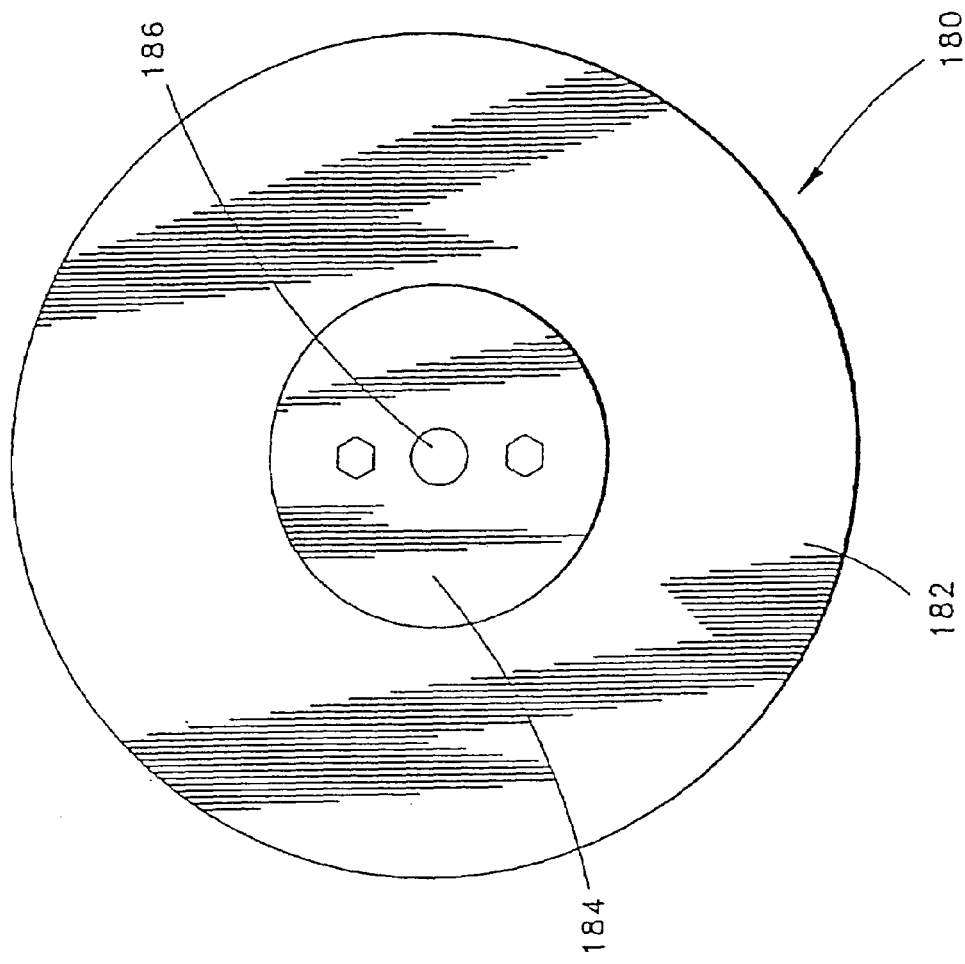
FIG. 19 is a plan view of a Follow Block comprised of Circular Cut Plywood Pieces ¾" thick positioned concentrically with a 1" thick×6" diameter mild steel Tail Stock Plate having a centrally located Tail Stock Aperture.
Figure 19A:
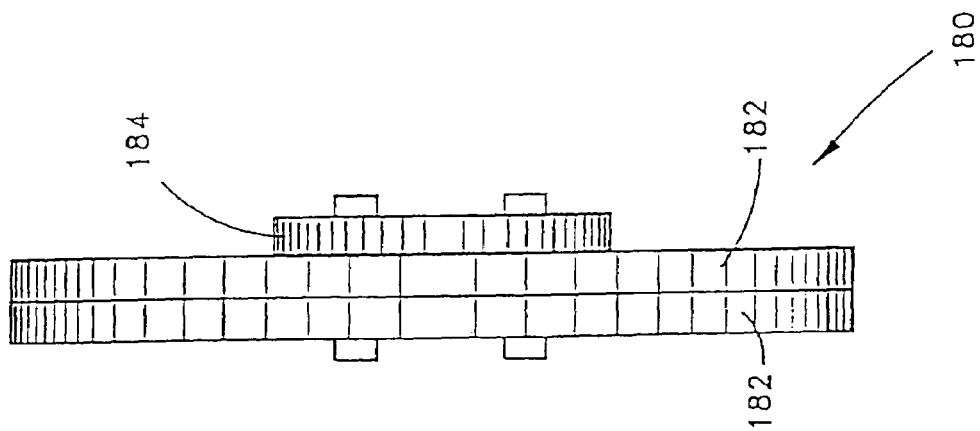
FIG. 19A is an elevation of a Follow Block.
Figure 20:
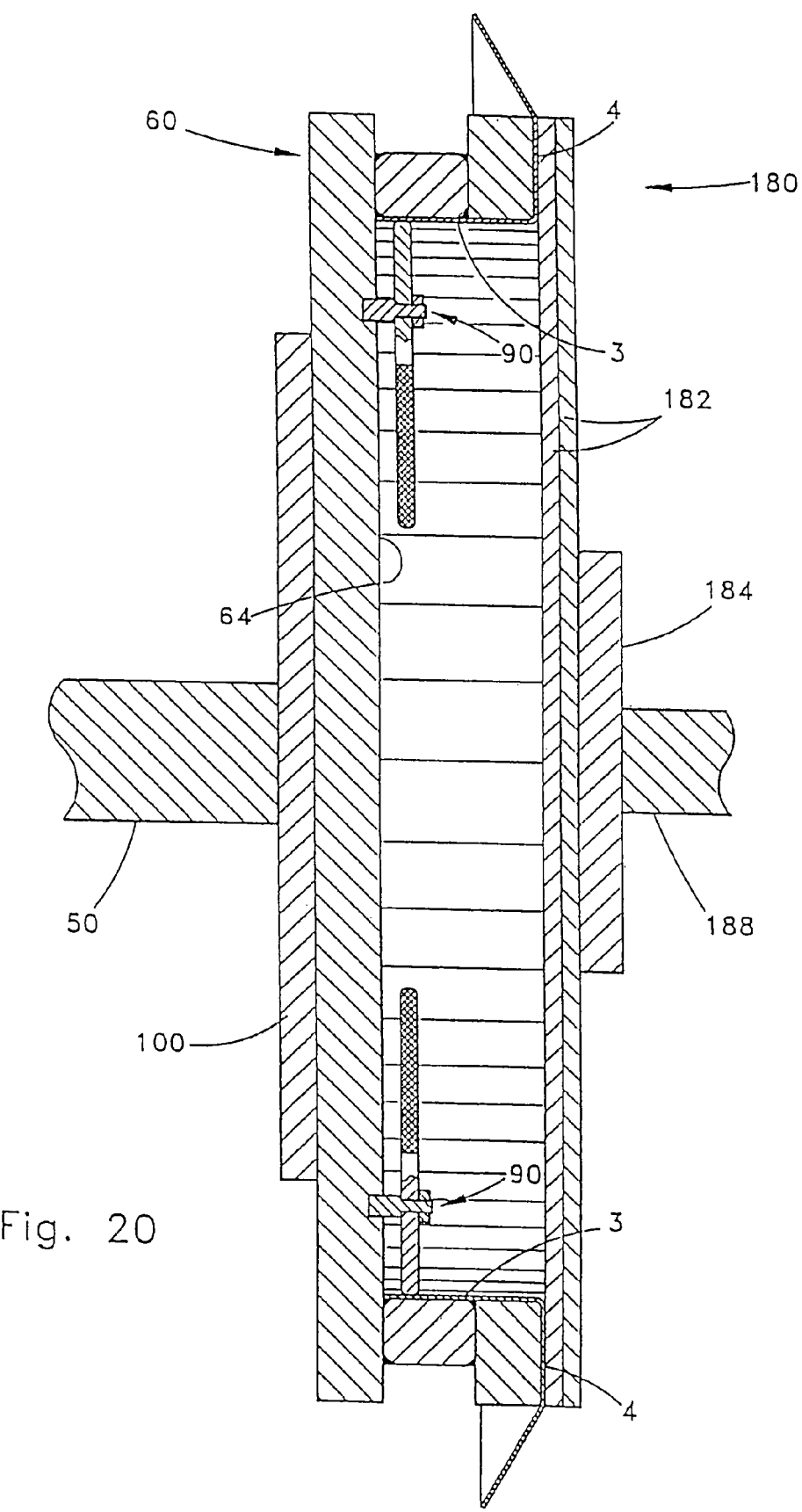
FIG. 20 is an elevation of the assembly restraining the Flanged Ring Band Stock including the Lathe Output Shaft, the Adapter Plate, the Spinning Die, the Flanged Ring Stock, and the Follow Block.

In one embodiment of the method of production by hand, a guide plate means may be affixed following formation of the exterior or interior mating flange 504 (or the interior mating flange 514, if forming the second cylindrical shaped ring), to a lathe tail stock 188, and is bound by friction against the exterior or interior mating flange 504, 514 portion of the flanged ring band stock, thereby securing the flanged ring band stock 40 between the mating surface 84 and the guide plate means. The guide plate means may be provided, for example, by a follow block 180, as shown in FIGS. 19 and 19A, preferably comprised of two cylindrical cut plywood or other material pieces 182, each ¾" thick, secured together to form a 1½" thick combined plywood or other material piece, having an outside diameter ideally substantially equal to the outside diameter of the mating surface 84. A 1" thick, 6" diameter mild steel tail stock plate 184 may have a centrally positioned tail stock aperture 186, sized to receive the lathe tail stock 188, which is concentrically affixed by means, for instance bolt means, to the circular cut plywood or other material pieces 182.

One method disclosed for the production of the circular flanged ring 510 is as follows:

I. The adapter plate 100 is mounted to the lathe output shaft 50.

II. The first spinning die 60 used to form the first cylindrical shaped ring 511 (optionally with backing plate 110 when the first cylindrical shaped ring 511 diameter is 42" and greater) is mounted to the adapter plate 100.

Figure 18:
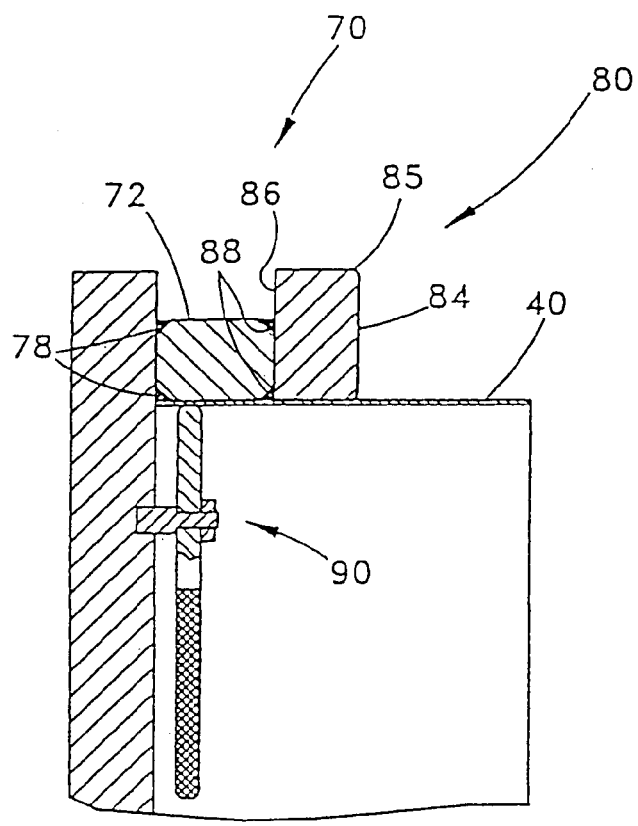
FIG. 18 is a partial cross sectional view showing the Flanged Ring Band Stock inserted into a Spinning Die in preparation for the machining steps to produce a Circular Flanged Ring.

III. A flanged ring band stock 40 is inserted into the first spinning die 60 and secured by clamps, as shown in FIG. 18.

IV. A tool rest 170 is mounted on the lathe cradle. A power lever 160 via a bottom surface pin 165 is inserted into an aperture at the tool rest top 172.

V. The lathe is powered causing the spinning die 60 to revolve.

Figure 18A:
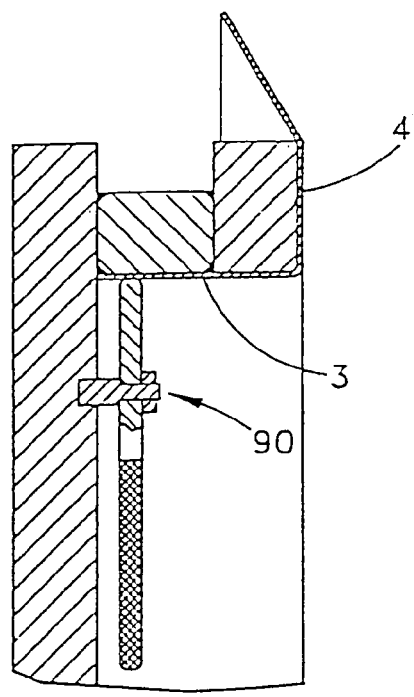
FIG. 18A is a partial cross-sectional view showing the results of the first machining step which is to stretch the portion of the Flanged Ring Band Stock which protrudes from the Spinning Die into a Mating Flange.

VI. An internal roller 120 is positioned on the top surface pin 164 of the power lever via an aperture in the internal roller handle 126. The internal roller wheel working surface 122 is positioned on the inside of the flange ring band stock 40 at the outer ¹⁄₁₆" of flange ring band stock 40 distal from the working surface 62 and causes the portion of the flange ring band stock 40 extending past the mating face 82 to be stretched and bent against the mating surface 84, forming an exterior mating flange 504, as shown in FIG. 18A. The portion of the flange ring band stock 40 received into the collar 70 and against the insertion face 75 is the outer insertion flange 503 forming approximately a 90° angle with the exterior mating flange 504, as shown in FIG. 18A. The portion of the flange ring band stock 40 extending from the exterior mating flange 504 portion of the workpiece distal from the outer insertion flange 503 and toward the portion of the flange ring band stock 40 which will include the exterior hem 505 is bent against the mating surface/hem edge 85 forming an approximate 20° angle between the exterior hem 505 portion and the exterior mating flange 504, as shown in FIG. 18A. This concludes the machine tool activity required of the internal roller 120.

Figure 18B:
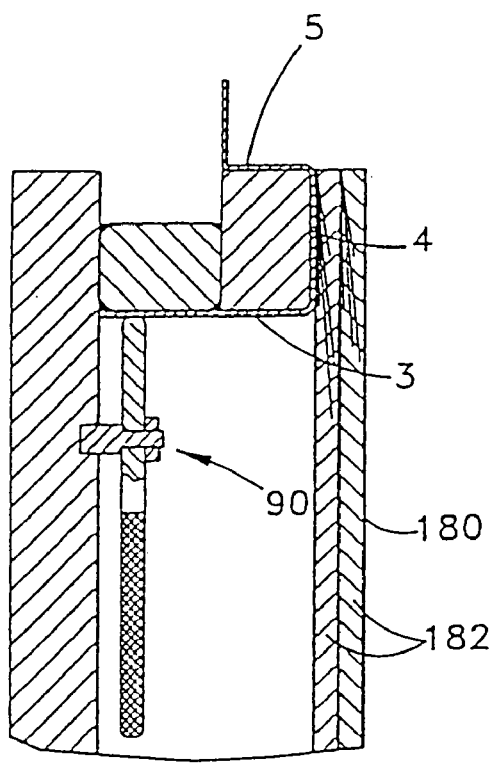
FIG. 18B is a partial cross-sectional view showing the association of the Follow Block with the Mating Flange and the forming of the Hem.
Figure 18C:
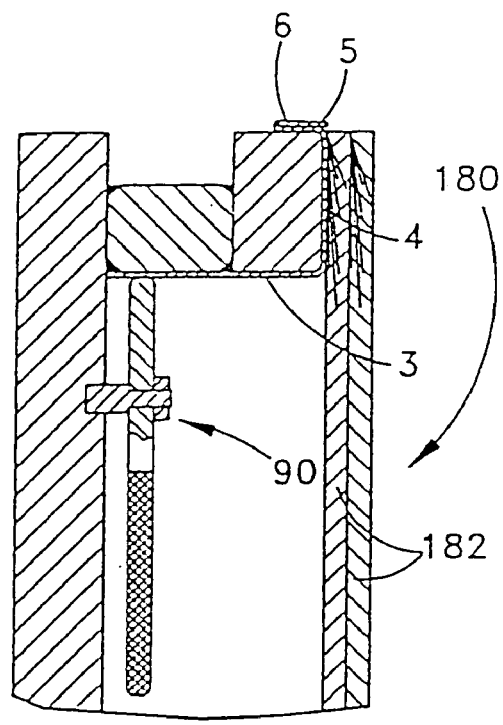
FIG. 18C is a partial cross-sectional view showing the final step consisting of forming the Return Flange of the Circular Flanged Ring.

VII. Upon conclusion of forming by the internal roller 120, a follow block 180 optionally may be positioned against the mating surface 84. The portion of the flange ring band stock 40 distal from the outer insertion flange 503 and exterior mating flange 504, which will form the exterior hem 505 and return hem 506 extends beyond the mating surface 84 and the follow block 180 and is accessible to machine tool operations. The interior roller 120 is removed from the power lever 160 and replaced with a radius roller 130. The radius roller wheel 132 convex working surface is positioned at a 45° angle to the mating surface 84 and initially is placed in contact with the follow block 180 in order to bring the radius roller wheel 132 up to speed. The radius roller wheel 132 is then forced onto the exposed portion of the flange ring band stock 40 at the mating surface/hem edge 85 causing the metal to stretch in contact with and forming the contour of the hem surface 76 forming, proximal to the exterior mating flange 504, the exterior hem 505, as shown in FIG. 18B. That portion of the flange ring band stock 40 most distal from the outer insertion flange 503 may form an approximately 90° angle with the exterior hem 505 and constitutes the portion of the flange ring band stock 40 which will be formed into the return flange 506, as shown in FIG. 18B.

VIII. The radius roller 130 is removed from the power lever 160 and replaced with the trim lever 140. The cutting tip 142 is placed in contact with the outside edge of the portion of the flange ring band stock 40 which will form the return flange 506 and cuts away any metal sufficient to leave approximately ⅜" for the return flange 506.

IX. The trim lever 140 is removed from the power lever 160 and replaced with the finishing roller 150. The right side of the finishing roller wheel 152 is placed in contact with the edge of the flange ring band stock 40 most distal from the outer insertion flange 503, at an approximate 45° angle with the flange ring band stock 40 which has been trimmed, allowing the finishing roller wheel 152 to be brought up to the speed of the spinning die 60. The finishing roller wheel 152 is urged against the edge of the flange ring band stock 40 causing the metal to fold back and in contact with the exterior hem 505, thus forming return flange 506.

X. The lathe is turned off and the completed first cylindrical flanged ring 511 is removed from the spinning die 60.

XI. The first spinning die 60 used to form the first cylindrical shaped ring 511 is removed to the adapter plate 100.

XII. The second spinning die 60 used to form the second cylindrical shaped ring 512 (optionally with backing plate 110 when the first cylindrical shaped ring 512 diameter is 42" and greater) is mounted to the adapter plate 100.

XIII. A flanged ring band stock 40 is inserted into the second spinning die 60 and secured by clamps, as shown in FIG. 18.

XIV. A tool rest 170 is mounted on the lathe cradle. A power lever 160 via a bottom surface pin 165 is inserted into an aperture at the tool rest top 172.

XV. The lathe is powered causing the spinning die 60 to revolve.

XVI. An internal roller 120 is positioned on the top surface pin 164 of the power lever via an aperture in the internal roller handle 126. The internal roller wheel working surface 122 is positioned on the inside of the flange ring band stock 40 at the outer ¹⁄₁₆" of flange ring band stock 40 distal from the working surface 62 and causes the portion of the flange ring band stock 40 extending past the mating face 82 to be stretched and bent against the mating surface 84 forming an interior mating flange 514, as shown in FIG. 18A. The portion of the flange ring band stock 40 received into the collar 70 and against the insertion face 75 is the inner insertion flange 513 forming approximately a 90° angle with the interior mating flange 514, as shown in FIG. 18A. The portion of the flange ring band stock 40 extending from the interior mating flange 514 portion of the workpiece distal from the inner insertion flange 513 and toward the portion of the flange ring band stock 40 which will include the interior hem 515 is bent against the mating surface/hem edge 85 forming an approximate 20° angle between the interior hem 515 portion and the interior mating flange 514, as shown in FIG. 18A. This concludes the machine tool activity required of the internal roller 120.

XVII. Upon conclusion of forming by the internal roller 120, a follow block 180 is positioned against the mating surface 84. The portion of the flange ring band stock 40 distal from the inner insertion flange 513 and interior mating flange 514, which will form the exterior hem 515 extends beyond the mating surface 84 and the follow block 180 and is accessible to machine tool operations. The interior roller 120 is removed from the power lever 160 and replaced with a radius roller 130. The radius roller wheel 132 convex working surface is positioned at a 45° angle to the mating surface 84 and initially is placed in contact with the follow block 180 in order to bring the radius roller wheel 132 up to speed. The radius roller wheel 132 is then forced onto the exposed portion of the flange ring band stock 40 at the mating surface/hem edge 85 causing the metal to stretch in contact with and forming the contour of the hem surface 76 forming, proximal to the interior mating flange 514, the interior hem 515, as shown in FIG. 18B.

XIX. The lathe is turned off and the completed second cylindrical flanged ring 512 is removed from the spinning die 60.

The method disclosed for the production of the Oval Flanged Ring 600 may be as follows:

I. A Circular Flanged Ring 510 is produced and is cut along a diameter producing two Semi-circular Flanged Ring Portions 602.

II. SMACNA T24 Linear Segments 604 are produced with the SMACNA T24 Flange Profile I by roll forming or other method.

Figure 1:
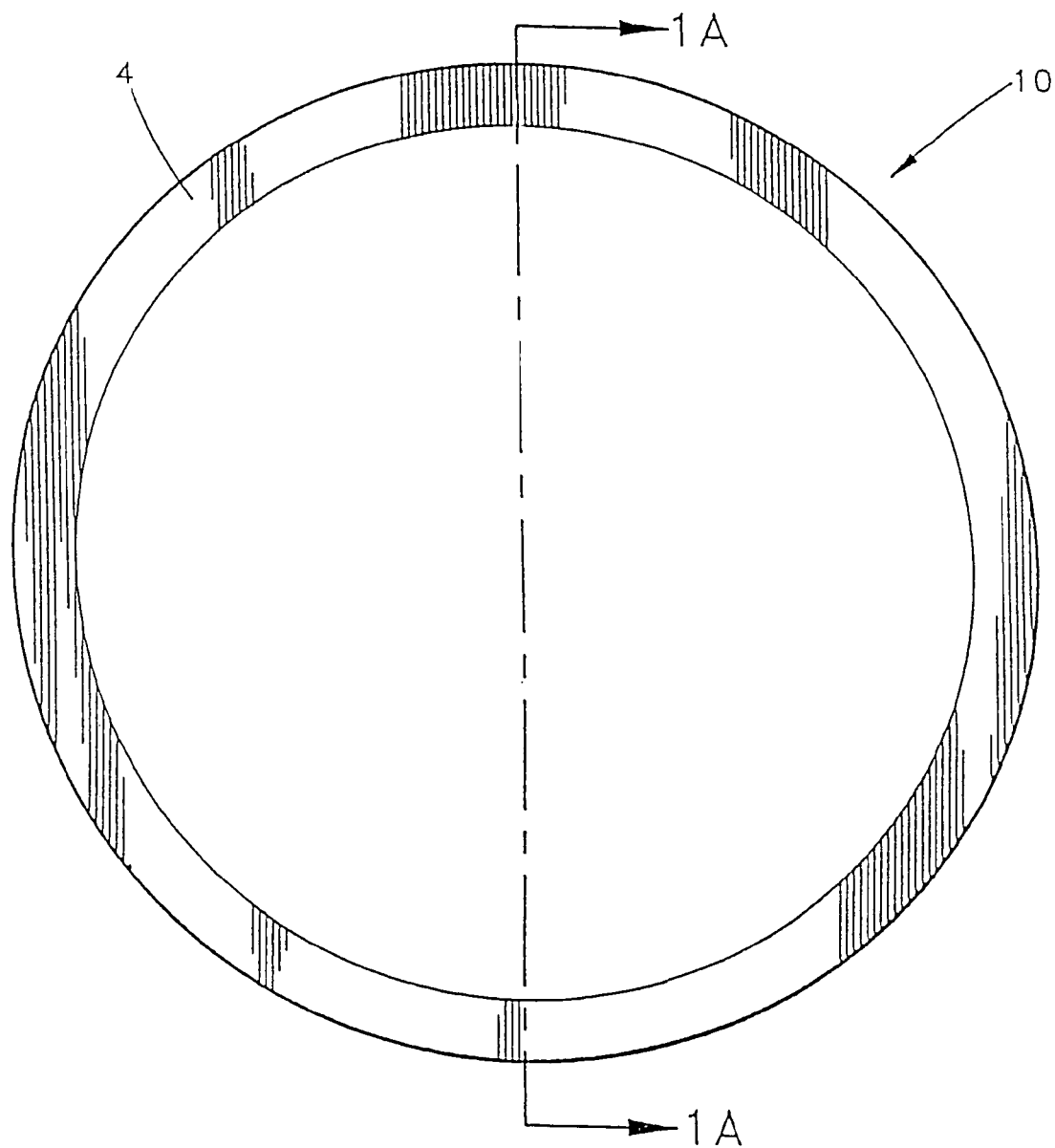
FIG. 1 is an elevational view of the Circular Flanged Ring.
Figure 1A:
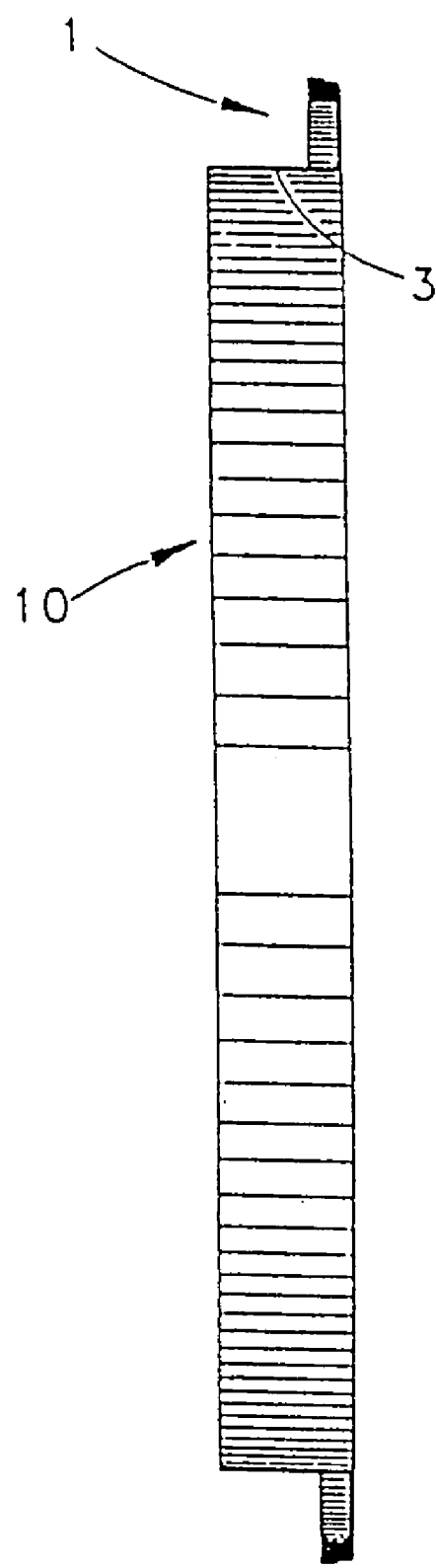
FIG. 1A is a section of FIG. 1 showing the cross section or profile of a T24 SMACNA Circular Flanged Ring and effectively the elevation view representative of both Circular and Oval Flanged Rings.
Figure 5:
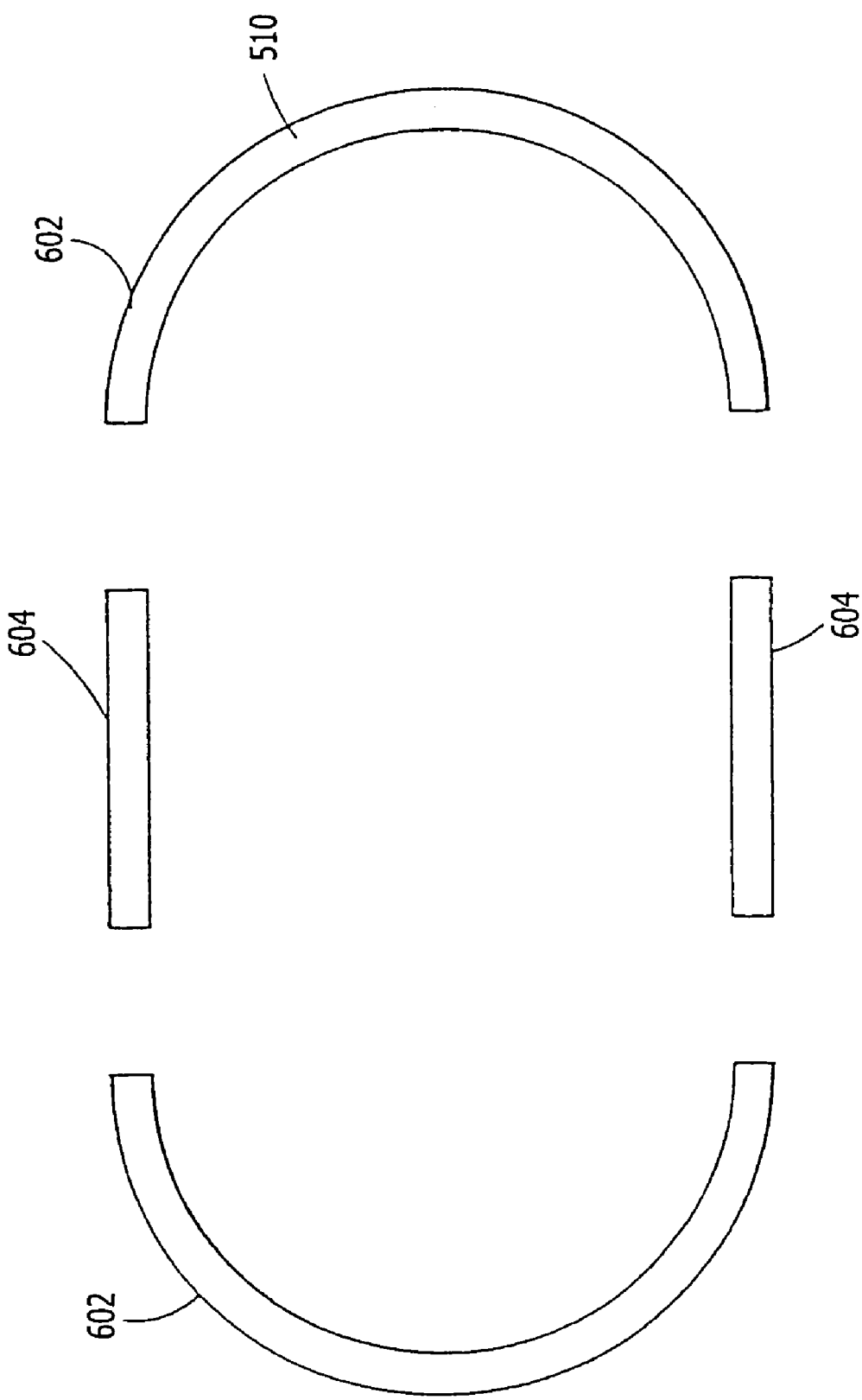
FIG. 5 is an elevational view of a Circular Flanged Ring, as depicted in FIGS. 1 and 3, cut along a common diameter in preparation for insertion of SMACNA T24 Linear Segments with the T24 cross section as a step in producing the T24 cross section Oval Flanged Ring.
Figure 5A:
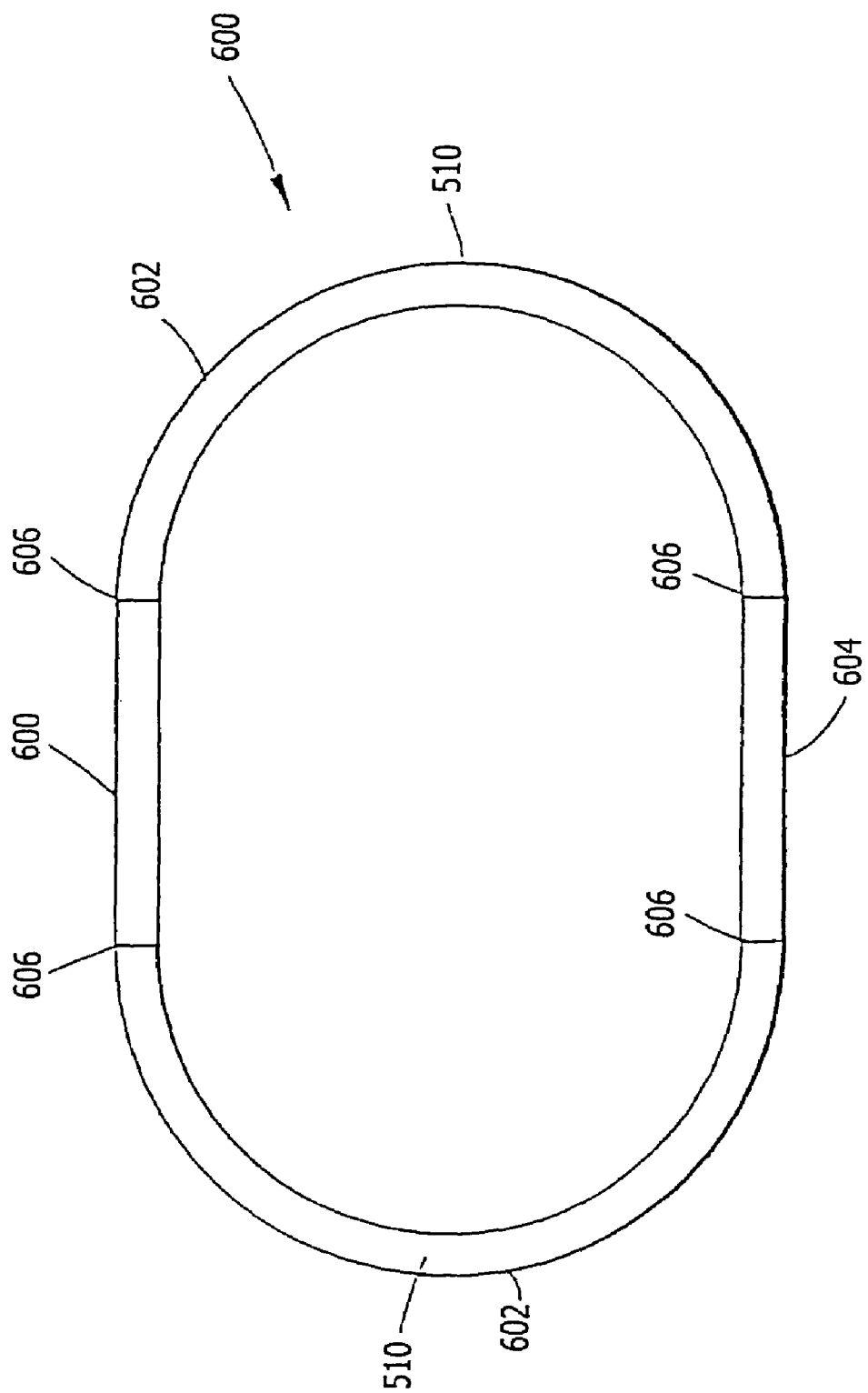
FIG. 5A is a plan view of an assembled Oval Flanged Ring depicting the connection of the Semicircular Flanged Ring Portions to the SMACNA T24 Linear Segments by means of welding.
Figure 6:
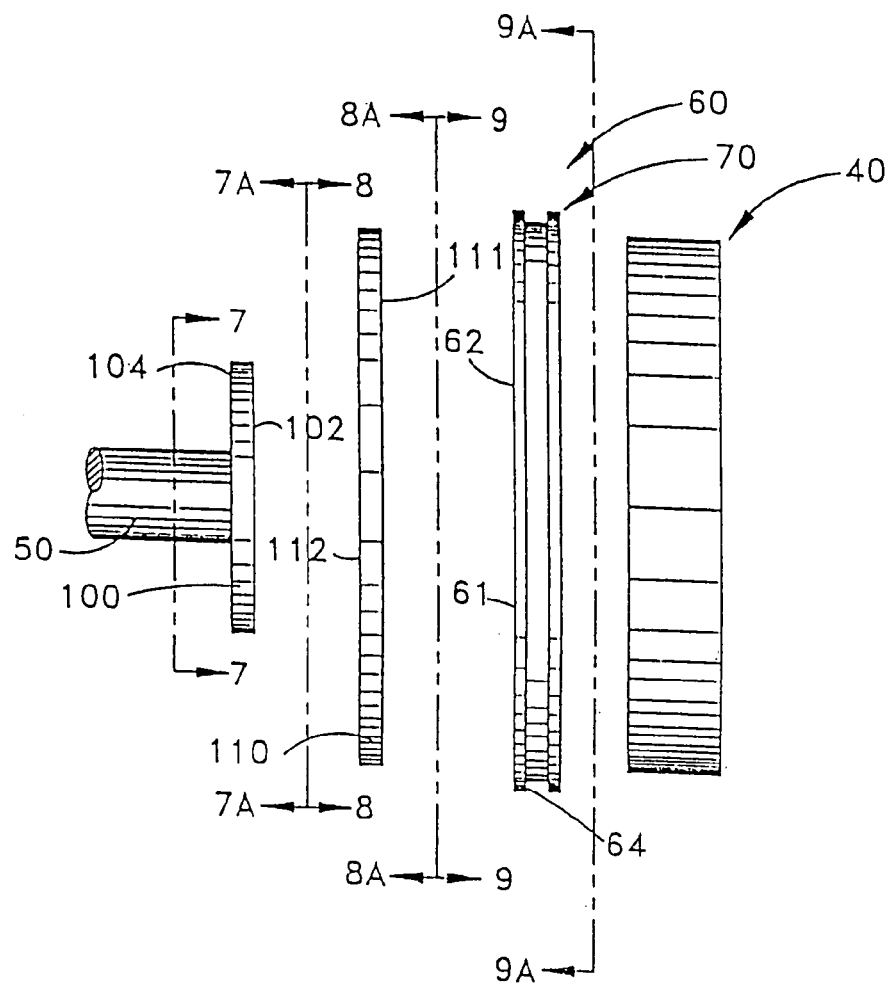
FIG. 6 is an exploded side view of a Lathe Output Shaft with attached Adapter Plate, Backing Plate and Spinning Die.
Figure 7:
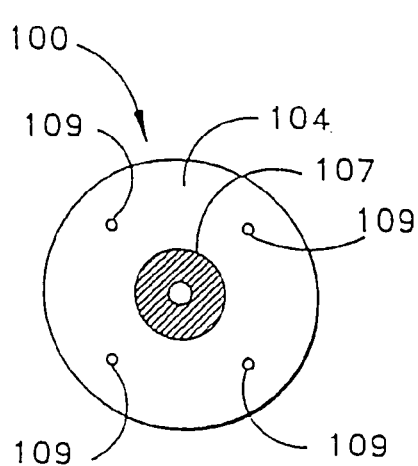
FIG. 7 is an elevation view of the Adapter Plate Reverse Side.
Figure 7A:
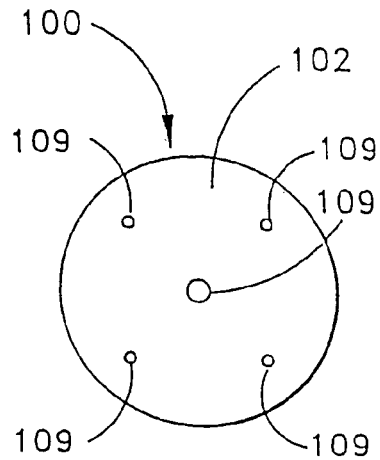
FIG. 7A is an elevation view of the Adapter Plate Obverse Side.
Figure 8:
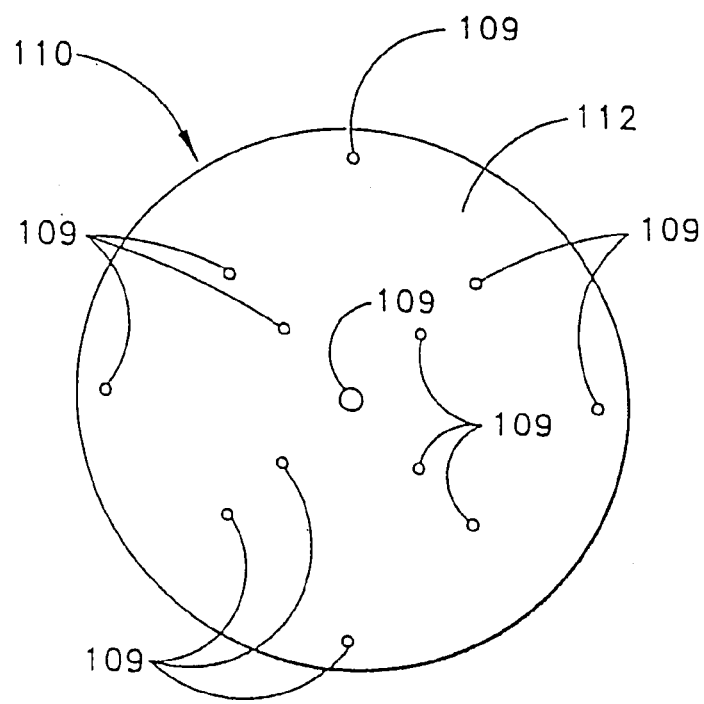
FIG. 8 is an elevation view of the Backing Plate Reverse Side.
Figure 8A:
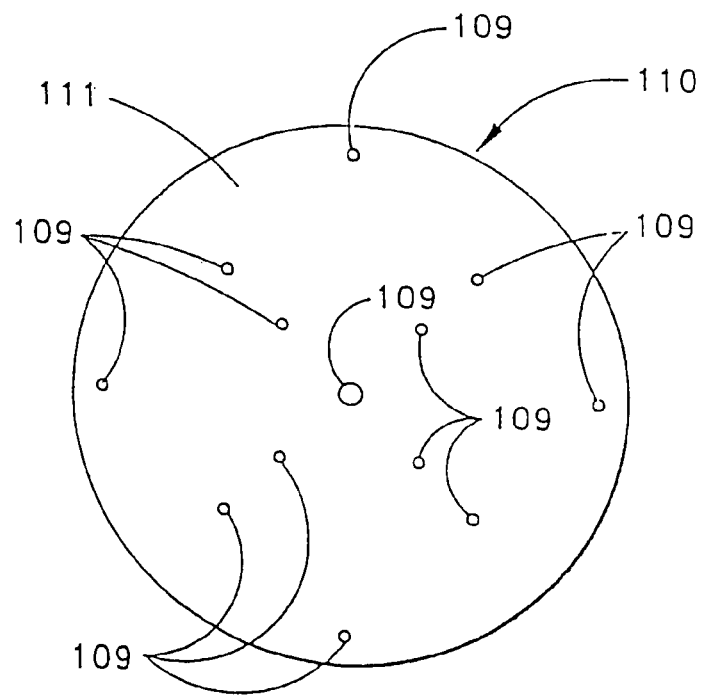
FIG. 8A is an elevation view of the Backing Plate Obverse Side.

III. The SMACNA T24 Linear Segments 604 are affixed by means, including welding, to the Semi-circular Flanged Ring Portions 602 at joints 606 to form the Oval Flanged Ring as shown in FIGS. 5 and 5A.

Figure 21:
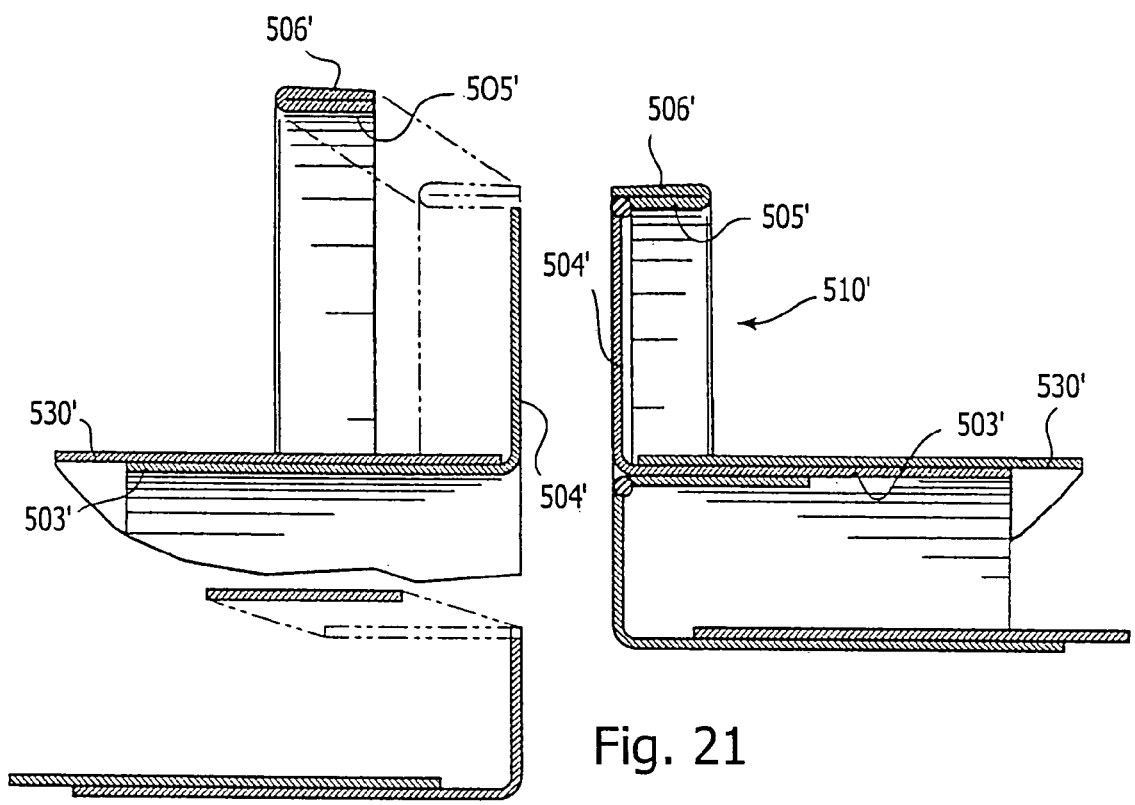
FIG. 21 is a view similar to FIG. 2 showing another embodiment of the present invention.

FIG. 21 illustrates an alternative to the foregoing described method for producing the first cylindrical shaped ring and the second cylindrical shaped ring 511', 512'. In the alternative method, both the exterior and the interior mating flanges 504', and 514' can be produced as described above, and then the outer perimeter of the mating flange trimmed to provide a desired maximum diameter. Thereafter the exterior hem 505' and the return flange 506' can be formed as a separate component by various methods, such as bending or rolling flat stock over on itself and then rolling the flat stock into a circular ring. The ends of the rolled, bent-over, or turned or rolled flat stock could be butt welded together, and then welded to the outer perimeter of the exterior mating flange 504'. The interior hem 515' may also be formed as a separate component by a method such as rolling flat stock into a circular ring, butt welding the ends, and attaching the circular ring to the outer perimeter of the interior mating flange 514'.

The exterior hem 505' and return flange 506' could instead be formed by a stamping process beginning with a flat, annular workpiece. Thereafter, the formed hem and flange could be welded to the outer perimeter of the exterior mating flange 504'. An interior hem 515' could also be stamped separately and then welded to the outer perimeter of the interior mating flange 514'. Producing the exterior hem 505' and return flange 506' as a separate component or the interior hem 515' as a separate component and then attaching such component to the outer perimeter of either the exterior or interior mating flange 504', 514' may not be as efficient as spin-forming the entire flange ring 510' as described above with respect to flange ring 510'. Also, this "2-step" method may result in a certain amount of distortion when the separately formed components are welded to the mating flanges 504', 514'. Nonetheless, the 2-step method may be carried out with less sophisticated tooling than required by the spinning method described above.

Figure 22:
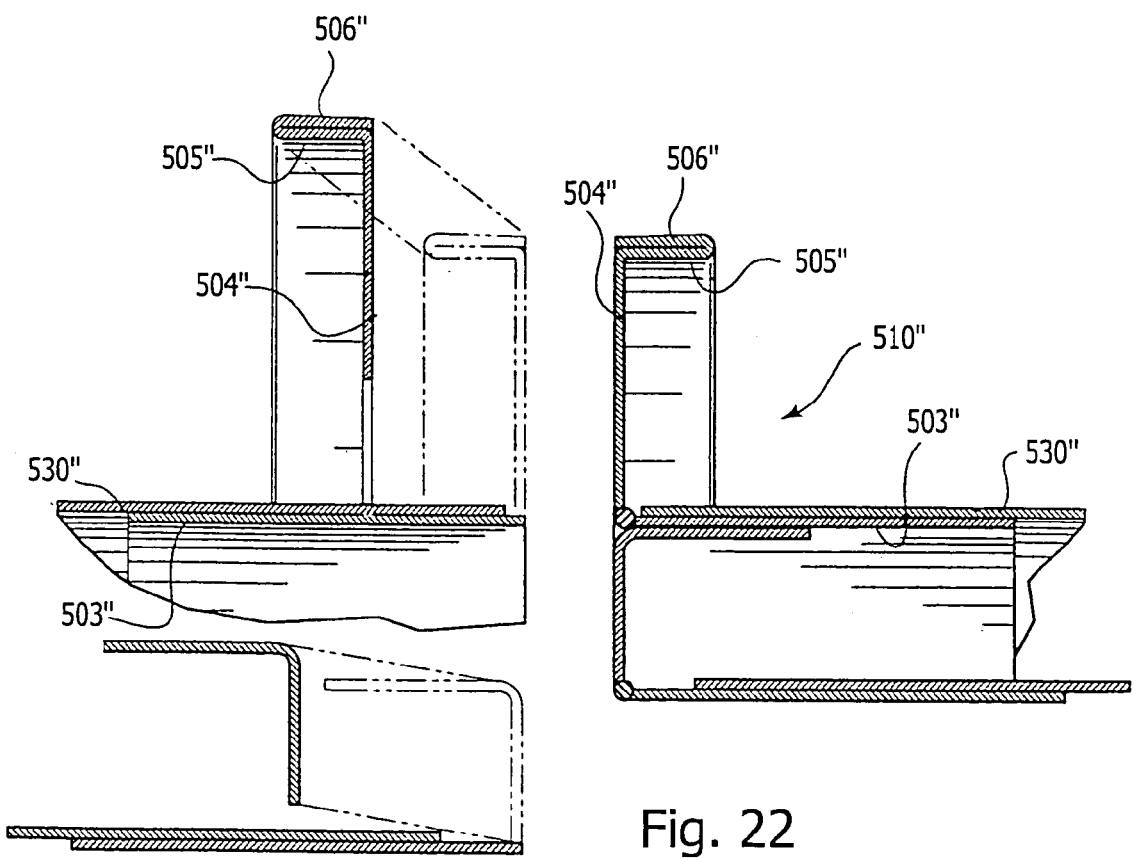
FIG. 22 is a view similar to FIG. 21 showing a further embodiment of the present invention.

As a further alternative, it is possible to produce the flanged ring 510" shown in FIG. 22 by forming the insertion flanges 503", 513" as one component and the mating flanges 504", 514", hems 505", 515", and return flange 506" as a second component. The insertion flanges 503", 513" can be produced as shown in FIGS. 10–10B and as described above. The mating flanges 504", 514", hems 505", 515", and return flange 506" could be produced by roll-forming using generally the techniques discussed above, or also perhaps by stamping. Thereafter, the two components can be assembled by welding the inside perimeter of each mating flange to the end edge of each insertion flange. This alternative technique may suffer from the same disadvantages of the technique shown in FIG. 21 above, including a larger number of manufacturing steps as well as significant distortion or warpage of the flanged ring 510" due to the welding operation. On the other hand, it may be possible to produce the flanged ring 510" using less sophisticated tooling than used to produce the flanged ring 510', as described above.

FIGS. 23A, 23B, 23C, 23D, 23E, and 23F illustrate an alternative to the foregoing described methods for producing a flanged ring 510'''. In this alternative method, an exterior and an interior mating flange 504''', 514''' can be spin formed as described above. Thereafter, the hem sections 505''', 515''' can be formed by a first roller set 200 consisting of a first roller assembly 202 composed of a major diameter roller 204 and a side-by-side smaller diameter roller 206, both mounted on a rotatable shaft 208. The first roller set 200 also includes a second roller assembly 210 consisting of a roller 212 mounted on a rotatable shaft 214. The rotatable roller shafts 208 and 214 may be moved towards and away from each other in a substantially parallel orientation in a well-known manner. When the shafts are moved toward each other, the roller 212, positioned at the side of roller 204, forms the exterior and interior hem sections 505''', 515''' by capturing each hem section between the adjacent face sections of the rollers 204 and 212. In addition, a precursor to the return flange 506''' may be formed between the outer diameter of roller 212 and the outer diameter of roller 206. See FIG. 23B wherein a hem section 505''' extends substantially laterally and optionally perpendicular to a mating flange 504''' and the precursor to the return flange 506''' extends substantially perpendicular to the adjacent end of the hem section.

Figure 23A:
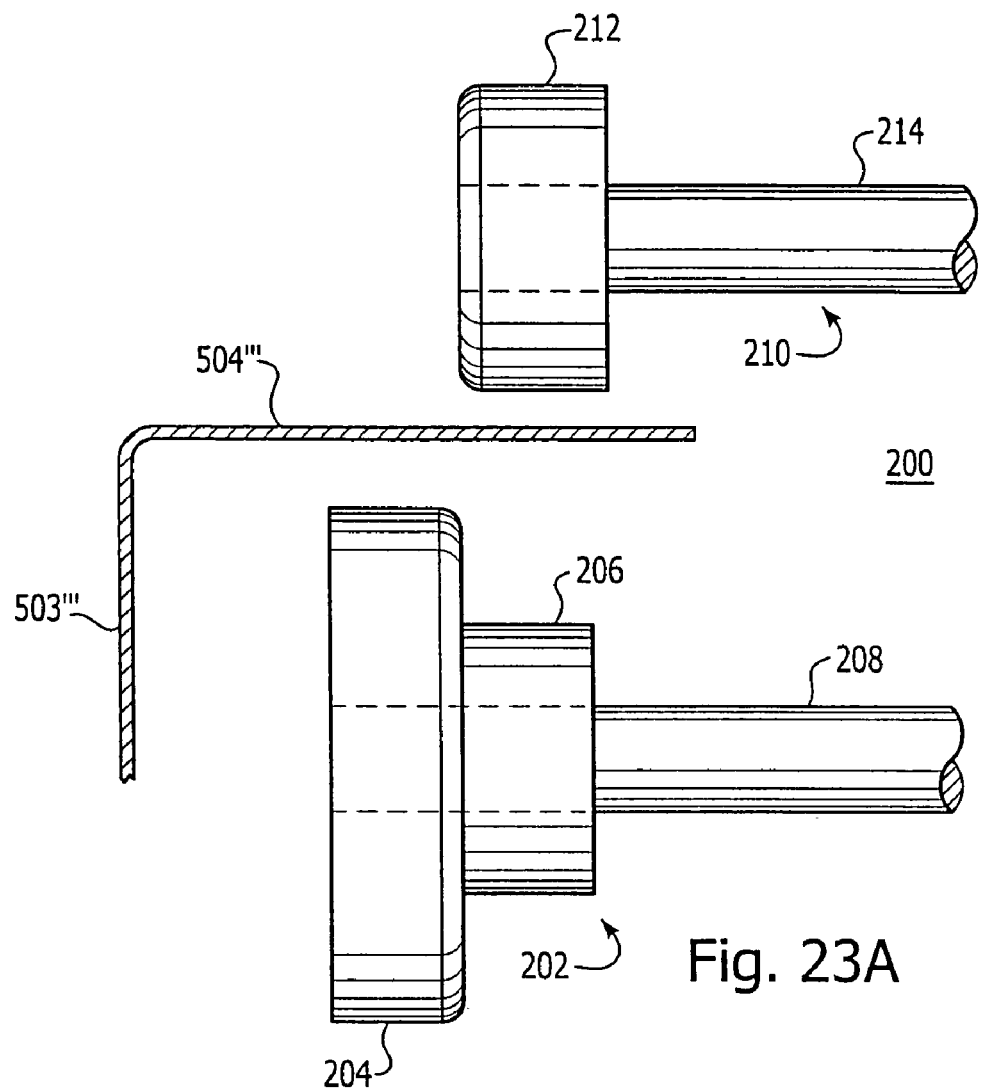
FIGS. 23A, 23B, 23C, 23D, 23E, and 23F illustrate another method of forming the present invention.
Figure 23B:
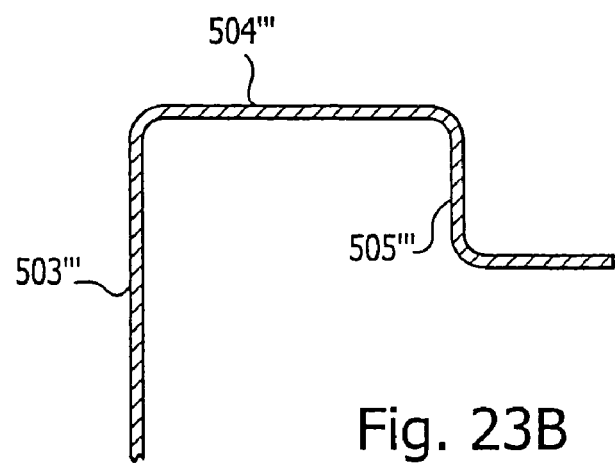
Figure 23C:
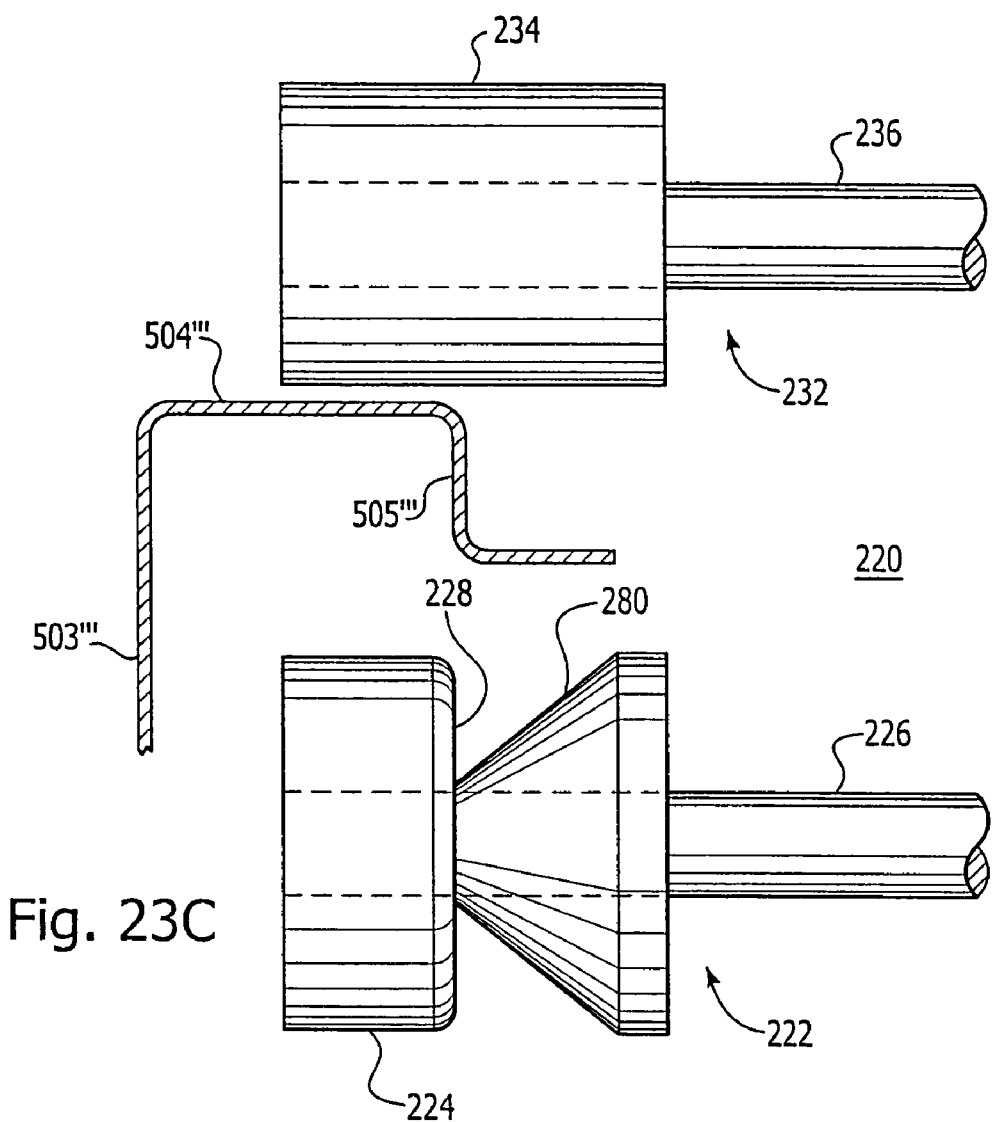

The partially formed Flanged Ring 511''' of FIG. 23B may be placed in a roller set 220 of FIG. 23C for further processing. The roller set 220 includes a die roller assembly 222 composed of a die roller 224 mounted on a rotatable shaft 226. The die roller 224 may have a groove formed around its outer perimeter in the shape of a half "V" composed of a vertical face 228 and a diagonal face 230. The roller set 222 may include a second roller assembly 232 composed of a cylindrical roller 234 mounted on a rotatable shaft 236. The roller assemblies 224 and 232 are capable of moving towards and away from each other while the rotatable shafts 226 and 236 remain substantially parallel to each other. As shown in FIG. 23C, the partially formed Flanged Ring 511''' from FIG. 23B is positioned relative to roller 224 so that hem section 505''' is adjacent vertical face 228 of roller 224. Thereafter, the roller sets 222 and 232 may be moved towards each other as the rollers 224 and 234 rotate relative to each other thereby causing the return flange section 506''' to assume the orientation of roller face 230 relative to roller face 228, as shown in FIG. 23D.

Figure 23D:
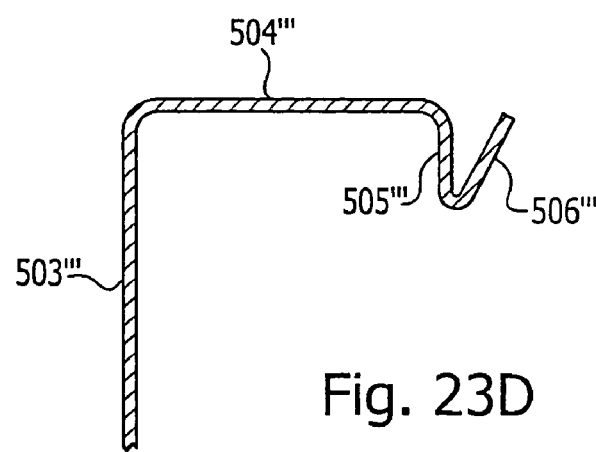
Figure 23E:
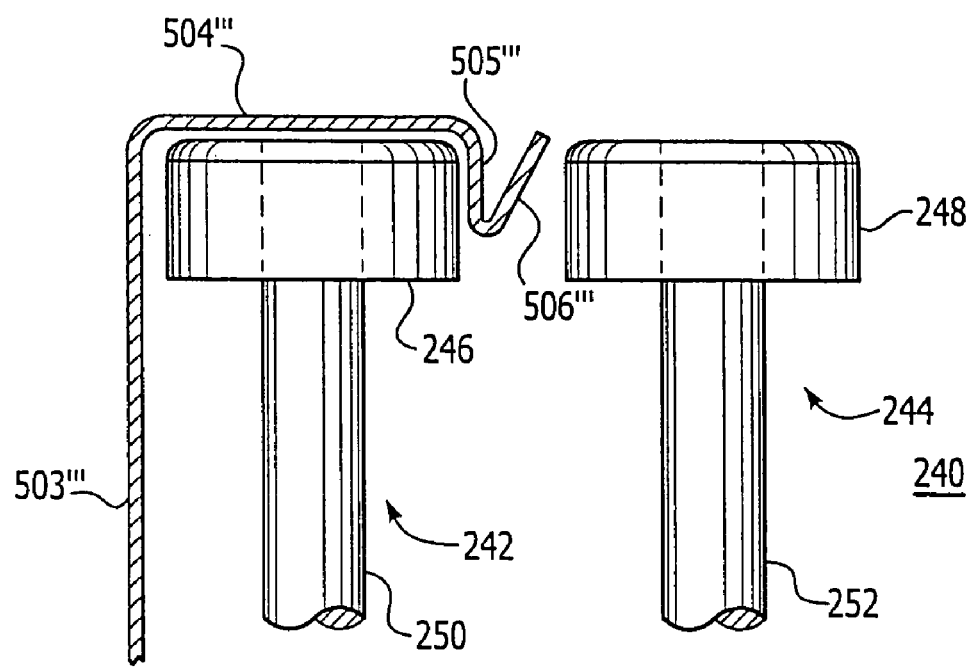
Figure 23F:
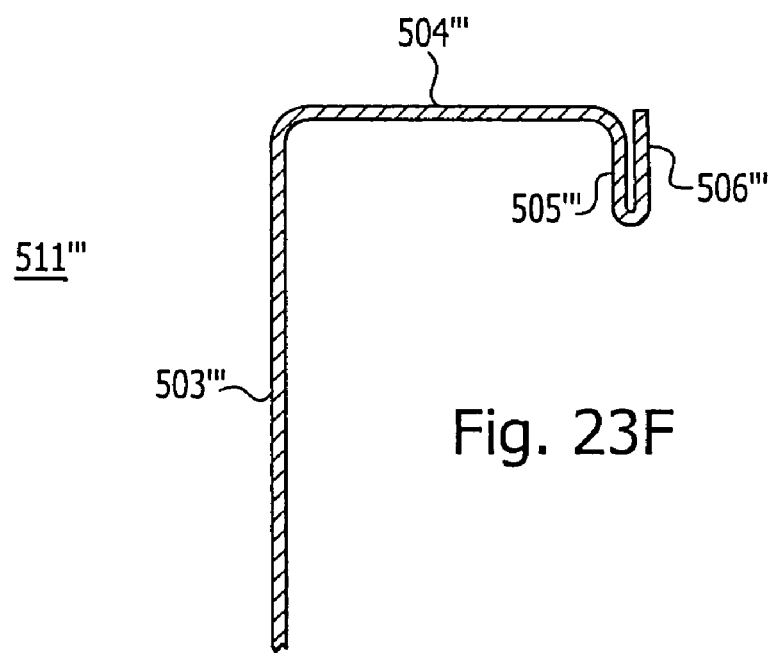

Thereafter, the flanged ring in the configuration of FIG. 23D may be further formed by roller set 240 shown in FIG. 23E. Roller set 240 consists of a pair of roller assemblies 242 and 244 each composed of a roller 246 and 248 carried by a corresponding rotatable shaft 250 and 252. As shown in FIG. 23E, the hem section 505''' and the partially formed return flange 506''' may be placed between the two rollers 246 and 248 and then the two rollers are moved relatively towards each other while rotating, thereby to pinch the hem section and return flange therebetween so that the return flange closely overlies the hem section and thereby completing the formation of the flanged ring 511''', as shown in FIG. 23F.

Although only the method of making the first flanged ring 511''' is shown, the second flanged ring can be constructed from the same initial method, but only the step shown in FIG. 23A is needed since the flanged ring 511''' does not have a return flange.

FIGS. 24A, 24B, 24C, and 24D illustrate another method of forming an outer flanged ring 511'''' in accordance with the present invention. As illustrated, the exterior mating flange 504'''' of the flanged ring 511'''' may be formed using a spin forming method, such as described above. Thereafter, the outer marginal portion of the mating flange may be placed in roller set 300 to partially form each hem section 505'''' and return flange 506'''', as shown in FIG. 24B. The roller set 300 may include a first roller assembly 302 consisting of a roller die 304 mounted on the rotatable shaft 306. A "V" shaped groove 308 extends around the circumference of the roller die 304 to match the outer perimeter profile of a roller die 310 mounted on rotatable shaft 312 of a roller assembly 314. The roller assemblies 302 and 314 are capable of moving towards and away from each other while their respective shafts 306 and 302 rotate and maintain an orientation substantially parallel to each other. As a consequence, when the outer marginal portion of the exterior mating flange 504'''' is placed in alignment with groove 308 and then the roller dies 304 and 310 rollably engage with each other they cooperatively form hem section 505'''' and return flange 506'''' in the orientation shown in FIG. 24B.

Thereafter, the partially formed flanged ring shown in FIG. 24B may be further worked by roller set 340 shown in FIG. 24C. The roller set 340 corresponds to the roller set 240 shown in FIG. 23E, with the description set forth above with respect to FIG. 23E applying to FIG. 24C, but with the part numbers increased by 100. Thus, such description will not be repeated. The result of roller set 340 is a finished flanged ring 511'''' as shown in FIG. 24D. Although only the method for making the first circular flanged ring 511''' is shown, the second circular flanged ring 512'''' can be constructed from the same method without the formation of the return flange 506''''.

It will be appreciated that other combinations of roller sets could be utilized to form the hem section and return flange of the flanged ring, other than as illustrated above in FIGS. 23 and 24. Although use of such rolling techniques may not be as efficient as spin forming the entire flange ring in the manner described above, utilizing rolling processes may enable the flange ring to be manufactured with less expensive tooling or with tooling already on hand as opposed to requiring extensive spin form tooling.

The foregoing description is related to the connectors for double wall ducting, including as shown in FIGS. 21 through 25. The present invention may also be used with respect to flanged connectors for single wall ducting as shown in FIGS. 1–4.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. A flanged ring used as a connector to join double wall circular ducts in HVAC systems, the double wall ducts having an outer duct and a structurally separate inner duct disposed within the outer duct, the flanged ring comprising:
   a first generally cylindrical-shaped ring composed of from 10–20 gauge metallic material, said first ring having a cross section with:
      an exterior mating flange defining a first annular mating face, said exterior mating flange defining an outer perimeter and an inner perimeter;
      an outer insertion flange extending laterally from the inner perimeter of the exterior mating flange and having an inside surface and an outside surface, said outer insertion flange having sufficient length to allow a fixed, direct attachment to an outer duct of a double wall circular duct, said outer insertion flange extendable unobstructedly beyond a fixed attachment to an outer duct and substantially concentric to an outer duct;
      an exterior hem that is substantially concentric to the outer insertion flange, said exterior hem extending outwardly from the outer perimeter of the exterior mating flange to overlap at least a portion of the outside surface of the outer insertion flange;
      the outer insertion flange, the exterior mating flange and the exterior hem collectively formed as a singular structure comprising the first ring; and
   a second generally cylindrical-shaped ring composed of from 10–20 gauge metallic material, said second ring having a cross section with:
      an interior mating flange defining a second annular mating face, said interior mating flange defining an outer perimeter and an inner perimeter;
      an inner insertion flange extending laterally from the inner perimeter of the interior mating flange, having sufficient length to allow a fixed, direct attachment to an inner duct of a double wall circular duct; and
      an interior hem that is substantially concentric to the inner insertion flange, said interior hem extending from the outer perimeter of the interior mating flange generally in the same direction as the inner insertion flange to overlap the inside surface of the outer insertion flange wherein the interior hem is connected to the inside surface of the outer insertion flange by any common means of fastening such that the interior mating flange and the exterior mating flange are aligned to form substantially one plane, the interior hem being of such length to permit the outer insertion flange to be fixedly attached to the interior of an outer duct wall and having sufficient length to allow connection with the outer insertion flange;
      the inner insertion flange, the interior mating flange and the interior hem collectively formed as a singular structure comprising the second ring.

2. The flanged ring in claim 1, wherein the inner insertion flange is longer than the outer insertion flange.

3. The flanged ring in claim 1, wherein the interior hem is fixedly attached to the outer insertion flange.

4. The flanged ring in claim 1, wherein the outer and inner insertion flanges are slidably engageable with the inside surfaces of outer and inner ducts.

5. The flanged ring in claim 1, further comprising a return flange affixed to the exterior hem, formed by turning a portion of the exterior hem located distally from the exterior mating flange over on itself.

6. The flanged ring in claim 1, wherein the outer insertion flange is welded to the interior hem.

7. A flanged ring used as a connector to join double wall oval ducts in HVAC systems, the double wall ducts having an outer duct and a structurally separate inner duct disposed within the outer duct, the flanged ring comprising:
   a first oval-shaped ring composed of from 10–20 gauge metallic material, said first ring having a cross section with:
      an exterior mating flange defining a first annular, oval-shaped mating face, said exterior mating flange defining an outer perimeter and an inner perimeter;
      an outer insertion flange extending laterally from the inner perimeter of the exterior mating flange and having an inside surface and an outside surface, said outer insertion flange having sufficient length to allow a fixed, direct attachment to an outer duct of a double wall oval duct, said outer insertion flange extendable unobstructedly beyond a fixed attachment to an outer duct and substantially concentric to an outer duct;
      an exterior hem that is substantially concentric to the outer insertion flange, said exterior hem extending outwardly from the outer perimeter of the exterior mating flange;
      the outer insertion flange, the exterior mating flange and the exterior hem collectively formed as a single structure comprising the first ring; and
   a second oval-shaped ring composed of from 10–20 gauge metallic material, said second ring having a cross section with:
      an interior mating flange defining a second annular, oval-shaped mating face, said interior mating flange defining an outer perimeter and an inner perimeter; and
      an inner insertion flange extending laterally from the inner perimeter of the interior mating flange, having sufficient length to allow a fixed, direct attachment to an inner duct of a double wall oval duct; and
      an interior hem that is substantially concentric to the inner insertion flange, said interior hem extending from the outer perimeter of the interior mating flange generally in the same direction as the inner insertion flange to overlap the inside surface of the outer insertion flange wherein the interior hem is connected to the inside surface of the outer insertion flange by any common means of fastening such that the interior mating flange and the exterior mating flange are aligned to form substantially one plane, the interior hem being of such length to permit the outer insertion flange to be fixedly attached to the interior of an outer duct wall and having sufficient length to allow connection with the outer insertion flange;
      the inner insertion flange, the interior mating flange and the interior hem collectively formed as a singular structure comprising the second ring.

8. The flanged ring in claim 7, further comprising a return flange structurally integral with the exterior hem, said return flange formed by forming a portion of the exterior hem located distally from the exterior mating flange over on itself.

9. The flanged ring in claim 7, wherein the outer insertion flange is welded to the interior hem.

10. The flanged ring in claim 7, wherein the interior hem is fixedly attached to the outer insertion flange.

11. The flanged ring in claim 7, wherein the outer and inner insertion flanges are slidably engageable with the inside surfaces of outer and inner ducts, respectively.

12. The flanged ring of claim 1, wherein said first ring is constructed from a single piece of from 10–20 gauge metallic material.

13. The flanged ring of claim 1, wherein said second ring is constructed from a single piece of from 10–20 gauge metallic material.

14. An HVAC ducting system for double wall cylindrical ducting, comprising:
   (A) a double wall cylindrical duct having an outer duct and a structurally separate inner duct disposed within the outer duct; and
   (B) a flanged ring to join the double wall cylindrical duct with other double wall cylindrical ducting, said flanged ring comprising:
      (i) a first generally cylindrical-shaped ring composed of from 10–20 gauge metallic material, said first ring having a cross section with:
         an exterior mating flange defining a first annular mating face, said exterior mating flange defining an outer perimeter and an inner perimeter;
         an outer insertion flange extending laterally from the inner perimeter of the exterior mating flange and having an inside surface and an outside surface, said outer insertion flange having sufficient length to allow a fixed, direct attachment to the outer duct of said double wall cylindrical duct, said outer insertion flange extending unobstructedly beyond the fixed attachment to the outer duct and substantially concentric to the outer duct;
         an exterior hem that is substantially concentric to the outer insertion flange, said exterior hem extending outwardly from the outer perimeter of the exterior mating flange;
         the outer insertion flange, the exterior mating flange and the exterior hem collectively formed as a single structure comprising the first ring; and
      (ii) a second generally cylindrical-shaped ring composed of from 10–20 gauge metallic material, said second ring having a cross section with:
         an interior mating flange defining a second annular mating face, said interior mating flange defining an outer perimeter and an inner perimeter;
         an inner insertion flange extending laterally from the inner perimeter of the interior mating flange, having sufficient length to allow a fixed, direct attachment to an inner duct of a double wall cylindrical duct; and
         an interior hem that is substantially concentric to the inner insertion flange, said interior hem extending from the outer perimeter of the interior mating flange generally in the same direction as the inner insertion flange to overlap the outer insertion flange wherein the interior hem is connected to the outer insertion flange by any common means of fastening such that the interior mating flange and the exterior mating flange are aligned to be substantially co-planar, the interior hem being of such length to permit the outer insertion flange to be fixedly attached to the interior of the outer duct wall and having sufficient length to allow connection with the outer insertion flange;

the inner insertion flange, the interior mating flange and the interior hem collectively formed as a singular structure comprising the second ring.

15. The flanged ring in claim 14, wherein the outer and inner insertion flanges slidably engage inside surfaces of the outer and inner ducts.

16. The flanged ring in claim 14, further comprising a return flange affixed to the exterior hem, formed by turning a portion of the exterior hem located distally from the exterior mating flange over on itself.

17. The flanged ring of claim 14, wherein the first ring is constructed from a singular piece of from 20–80 gauge metallic material.

18. The flanged ring according to claim 14, wherein the second ring is constructed from a single piece of from 10–20 gauge metallic material.

19. The flanged ring according to claim 14, wherein the interior hem of the second ring is attached to the inside surface of the insertion flange of the outer ring.

* * * * *